(12) United States Patent
Kato et al.

(10) Patent No.: US 11,619,591 B2
(45) Date of Patent: *Apr. 4, 2023

(54) IMAGE INSPECTION APPARATUS AND IMAGE INSPECTION METHOD

(71) Applicant: OMRON Corporation, Kyoto (JP)

(72) Inventors: Yutaka Kato, Kyotanabe (JP); Shingo Inazumi, Amagasaki (JP)

(73) Assignee: OMRON Corporation, Kyoto (JP)

(*) Notice: Subject to any disclaimer, the term of this patent is extended or adjusted under 35 U.S.C. 154(b) by 1068 days.

This patent is subject to a terminal disclaimer.

(21) Appl. No.: 16/247,598

(22) Filed: Jan. 15, 2019

(65) Prior Publication Data

US 2019/0265171 A1  Aug. 29, 2019

(30) Foreign Application Priority Data

Feb. 23, 2018 (JP) .............................. JP2018-030931

(51) Int. Cl.
*G01N 21/88* (2006.01)
*G01N 21/47* (2006.01)
*G01B 11/25* (2006.01)

(52) U.S. Cl.
CPC ..... *G01N 21/8806* (2013.01); *G01B 11/2513* (2013.01); *G01B 11/2527* (2013.01);
(Continued)

(58) Field of Classification Search
CPC .............. G01N 21/8806; G01N 21/47; G01N 21/8851; G01N 2021/4711; G01N 2021/8887; G01B 11/2513; G01B 11/2527

See application file for complete search history.

(56) References Cited

U.S. PATENT DOCUMENTS

2002/0067474 A1* 6/2002 Uomori .................. G01S 7/4911
356/3.01
2007/0019186 A1* 1/2007 Sung .................. G01N 21/8806
356/237.5

(Continued)

FOREIGN PATENT DOCUMENTS

CN    1350202    5/2002
JP    2002195812    7/2002

(Continued)

OTHER PUBLICATIONS

"Search Report of Europe Counterpart Application", dated Jun. 19, 2019, p. 1-p. 7.

(Continued)

*Primary Examiner* — Jamil Ahmed
(74) *Attorney, Agent, or Firm* — JCIPRNET

(57) ABSTRACT

An image inspection apparatus includes: an image capturing unit which captures images of an object; a transparent illumination unit which has a light-emitting surface which radiates light to the object and is configured to be able to control a light-emitting position on the light-emitting surface and a radiation direction of the light; and a control unit which is configured to control the image capturing unit and the illumination unit. The control unit causes the illumination unit to change the light-emitting position and the radiation direction, causes the image capturing unit to capture images of the object, identifies a light-emitting position and a radiation direction of the illumination unit when a measurement point of the surface of the object is illuminated from images of the object, and calculates a distance to the measurement point on the basis of the identified light-emitting position and the identified radiation direction.

13 Claims, 16 Drawing Sheets

(52) U.S. Cl.
CPC ......... *G01N 21/47* (2013.01); *G01N 21/8851* (2013.01); *G01N 2021/4711* (2013.01); *G01N 2021/8887* (2013.01)

(56) References Cited

U.S. PATENT DOCUMENTS

| | | | |
|---|---|---|---|
| 2010/0014063 A1* | 1/2010 | Sumi | G02B 26/0833 359/290 |
| 2015/0015701 A1* | 1/2015 | Yu | H04N 5/2259 348/136 |
| 2015/0116461 A1 | 4/2015 | Schinner et al. | |
| 2015/0355101 A1 | 12/2015 | Sun | |
| 2017/0115497 A1 | 4/2017 | Chen et al. | |
| 2018/0367722 A1* | 12/2018 | Hashiguchi | H04N 5/23232 |

FOREIGN PATENT DOCUMENTS

| | | |
|---|---|---|
| JP | 2006275651 | 10/2006 |
| JP | 2009164033 | 7/2009 |
| JP | 2014096253 | 5/2014 |
| JP | 2015148583 | 8/2015 |
| JP | 2017062120 | 3/2017 |
| WO | 2007026690 | 3/2007 |

OTHER PUBLICATIONS

"Office Action of China Counterpart Application", dated Apr. 30, 2021, with English translation thereof, pp. 1-15.

Office Action of Japan Counterpart Application, with English translation thereof, dated Mar. 23, 2021, pp. 1-10.

\* cited by examiner

IMAGE INSPECTION APPARATUS AND IMAGE INSPECTION METHOD

CROSS-REFERENCE TO RELATED APPLICATION

This application claims the priority benefit of Japanese application serial no. 2018-030931, filed on Feb. 23, 2018. The entirety of the above-mentioned patent application is hereby incorporated by reference herein and made a part of this specification.

BACKGROUND

Technical Field

The present technology relates to an image inspection apparatus and an image inspection method for inspecting an object using a captured image.

Description of Related Art

In the field of factory automation (FA) and the like, capturing an image of an object while illuminating the object and inspecting the exterior of the object using the acquired captured image is known.

For example, Japanese Laid-Open No. 2017-62120 (Patent Document 1) discloses an inspection system using an illumination device including a surface light source, and a lens, a light-shielding mask and a filter disposed between the surface light source and an inspection target. In this system, a radiation solid angle of inspection light radiated to each point of the inspection target is formed approximately uniformly according to the lens, the light-shielding mask and the filter. Accordingly, a whole visual field can be uniformly radiated to improve object inspection accuracy.

Japanese Unexamined Patent Application Publication No. 2017-62120 discloses a configuration for controlling a radiation solid angle of inspection light uniformly but does not disclose an inspection method using the inspection light and a configuration of an apparatus for performing the inspection method.

SUMMARY

According to an example of the present disclosure, an image inspection apparatus includes: an image capturing unit which captures images of an object; a transparent illumination unit which is disposed between the object and the image capturing unit, has a light-emitting surface which radiates light to the object and is configured to be able to control a light-emitting position on the light-emitting surface and a radiation direction of the light; and a control unit which is configured to control the image capturing unit and the illumination unit. The control unit causes the illumination unit to change the light-emitting position and the radiation direction, causes the image capturing unit to capture images of the object, identifies a light-emitting position and a radiation direction of the illumination unit when a measurement point of the surface of the object is illuminated from images of the object, and calculates a distance to the measurement point on the basis of the identified light-emitting position and the identified radiation direction.

DESCRIPTION OF THE EMBODIMENTS

Figure 1:
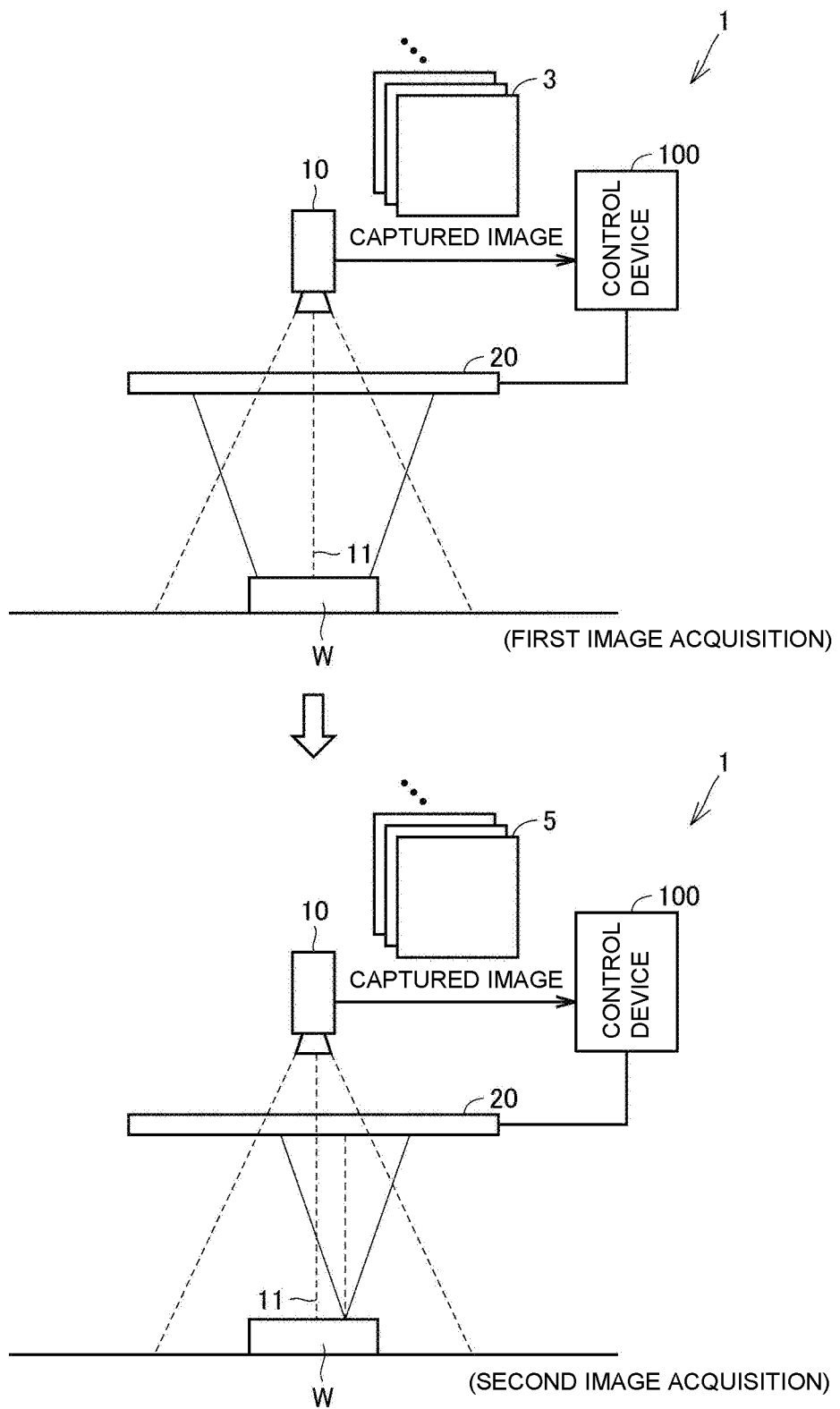
FIG. 1 is a diagram schematically showing an image inspection apparatus according to the present embodiment.

An objective of the present disclosure is to provide an image inspection apparatus and an image inspection method capable of performing inspection of an object by controlling a light-emitting position and a radiation angle of light.

According to an example of the present disclosure, an image inspection apparatus includes: an image capturing unit which captures images of an object; a transparent illumination unit which is disposed between the object and the image capturing unit, has a light-emitting surface which radiates light to the object and is configured to be able to control a light-emitting position on the light-emitting surface and a radiation direction of the light; and a control unit which is configured to control the image capturing unit and the illumination unit. The control unit causes the illumination unit to change the light-emitting position and the radiation direction, causes the image capturing unit to capture images of the object, identifies a light-emitting position and a radiation direction of the illumination unit when a measurement point of the surface of the object is illuminated from images of the object, and calculates a distance to the measurement point on the basis of the identified light-emitting position and the identified radiation direction.

According to this disclosure, the illumination unit can control a light-emitting position thereof and a radiation angle of light according to the control unit. Accordingly, it is possible to provide an image inspection apparatus capable of inspecting an object by controlling a light-emitting position and a radiation angle of light. The surface of an object which reflects light is the surface of a mirror, for example. The shape of the surface of the mirror is not limited and a distance to a measurement point can be calculated.

In the above-described disclosure, the image capturing unit captures images of the object multiple times to generate a plurality of first captured images when the illumination unit illuminates the object while changing the light-emitting position. The image capturing unit captures images of the object multiple times to generate a plurality of second captured images when the illumination unit illuminates the object while changing the radiation direction. The control unit generates a first data array having information about the light-emitting position for illuminating the measurement point of the object from the plurality of first captured images. The control unit generates a second data array having information about the radiation direction for illuminating the measurement point of the object from the plurality of second captured images. The control unit calculates the distance from the information on the light-emitting position included in the first data array and the information on the radiation direction included in the second data array.

According to this disclosure, the control unit can calculate the distance to the measurement point by generating the first data array and the second data array.

In the above-described disclosure, the illumination unit includes a plurality of illumination elements disposed in a matrix form. Each of the plurality of illumination elements includes a plurality of light-emitting units arranged in a matrix form and configured to be able to selectively emit light, and an optical system configured to control a radiation direction of light emitted from each of the plurality of light-emitting units to be a direction corresponding to the position of each of the plurality of light-emitting units. The control unit radiates light in a striped pattern to the object by controlling turning on and turning off of each of the plurality of illumination elements of the illumination unit and changes the light-emitting position by changing any of the phase of the striped pattern, the period of stripes of the striped pattern and the direction of the stripes. The control unit changes the radiation direction by controlling turning on and turning off of the plurality of light-emitting units of each of the plurality of illumination elements of the illumination unit.

According to this disclosure, the control unit can control a light-emitting position of the illumination unit and a radiation direction of light by controlling each of the plurality of illumination elements of the illumination unit and each of the plurality of light-emitting units included in each illumination element. A light-emitting unit which will emit light may be selected according to a place of visual field. Accordingly, it is possible to realize an image inspection apparatus capable of arbitrarily setting a radiation solid angle for each place of visual field. Further, since a radiation solid angle may be arbitrarily changed, an optical part such as a slit or a half mirror, for example, may be unnecessary. Accordingly, an illumination device may be reduced in size. As a result, a radiation solid angle may be set for each place of visual field and an image inspection apparatus which can be reduced in size may be realized.

In the above-described disclosure, the optical system includes a plurality of micro-lenses provided to respectively face the plurality of light-emitting units.

According to this disclosure, an image inspection apparatus which can be reduced in size may be realized.

In the above-described disclosure, the plurality of micro-lenses are disposed such that optical axes of at least some of the micro-lenses deviate from optical axes of light-emitting units facing the at least some of the micro-lenses.

According to this disclosure, a radiation direction of light may be controlled according to a simple configuration.

In the above-described disclosure, in at least one of the plurality of illumination elements, the at least some micro-lenses are disposed at a pitch less than a pitch of the light-emitting units.

According to this disclosure, a radiation direction of light may be controlled according to a simple configuration.

In the above-described disclosure, the plurality of micro-lenses are disposed such that the optical axes of at least some of the plurality of micro-lenses are inclined with respect to the optical axes of light-emitting units facing the at least some of the micro-lenses.

According to this disclosure, a radiation direction of light may be controlled according to a simple configuration.

In the above-described disclosure, the illumination unit further includes a light-shielding part configured to shield light leaking from the edge of each of the plurality of micro-lenses among lights emitted from the plurality of light-emitting units.

According to this disclosure, it is possible to reduce a possibility that light from light-emitting units leak in an unintended direction.

According to an example of the present disclosure, an image inspection method is performed by an image inspection apparatus including: an image capturing unit which captures images of an object; a transparent illumination unit which is disposed between the object and the image capturing unit, has a light-emitting surface which radiates light to the object and is configured to be able to control a light-emitting position on the light-emitting surface and a radiation direction of the light; and a control unit which is configured to control the image capturing unit and the illumination unit. The image inspection method includes: a step in which the illumination unit changes the light-emitting position and the radiation direction and the image capturing unit captures images of the object; a step of identifying a light-emitting position and a radiation direction of the illumination unit when a measurement point of the surface of the object is illuminated from images of the object acquired in the step of capturing images; and a step of calculating a distance to the measurement point on the basis of the identified light-emitting position and the identified radiation direction.

According to this disclosure, the illumination unit can control a light-emitting position thereof and a radiation angle of light according to the control unit. Accordingly, it is possible to provide an image inspection apparatus capable of inspecting an object by controlling a light-emitting position and a radiation angle of light.

In the above-described disclosure, the step of capturing images includes: a step of capturing images of the object multiple times to generate a plurality of first captured images when the illumination unit illuminates the object while changing the light-emitting position; and a step of capturing images of the object multiple times to generate a plurality of second captured images when the illumination unit illuminates the object while changing the radiation direction. The step of identifying the light-emitting position and the radiation direction includes: a step of generating a first data array having information about the light-emitting position for illuminating the measurement point of the object from the plurality of first captured images; and a step of generating a second data array having information about the radiation direction for illuminating the measurement point of the object from the plurality of second captured images. The step of calculating includes a step of calculating the distance from the information on the light-emitting position included in the first data array and the information on the radiation direction included in the second data array.

According to this disclosure, it is possible to calculate the distance to the measurement point by generating the first data array and the second data array.

In the above-described disclosure, the illumination unit includes a plurality of illumination elements disposed in a matrix form. Each of the plurality of illumination elements includes a plurality of light-emitting units arranged in a matrix form and configured to be able to selectively emit light, and an optical system configured to control a radiation direction of light emitted from each of the plurality of light-emitting units to be a direction corresponding to the position of each of the plurality of light-emitting units. The step in which the illumination unit changes the light-emitting position and the radiation direction includes: a step of radiating light in a striped pattern to the object by controlling turning on and turning off of each of the plurality of illumination elements of the illumination unit and changing the light-emitting position by changing any of the phase of the striped pattern, the period of stripes of the striped pattern and the direction of the stripes; and a step of changing the radiation direction by controlling turning on and turning off of the plurality of light-emitting units of each of the plurality of illumination elements of the illumination unit.

According to this disclosure, the control unit can control a light-emitting position of the illumination unit and a radiation direction of light by controlling each of the plurality of illumination elements of the illumination unit and each of the plurality of light-emitting units included in each illumination element.

According to the present disclosure, it is possible to provide an image inspection apparatus and an image inspection method capable of inspecting an object by controlling a light-emitting position and a radiation angle of light.

Embodiments of the present disclosure will be described in detail with reference to the drawings. The same or corresponding parts in the figures are denoted by the same reference signs and description thereof will not be repeated.

A. Example of Application

First, an example of a situation to which the present disclosure is applied will be described with reference to FIG. 1. FIG. 1 is a diagram schematically showing an image inspection apparatus 1 according to the present embodiment.

The image inspection apparatus 1 according to the present embodiment is applied to an apparatus which captures an image of an object (hereinafter referred to as a "workpiece W") while illuminating the object and inspects the exterior (for scratches, contamination, foreign materials and the like) of the workpiece W using the acquired captured image in a production line for industrial products, and the like. The image inspection apparatus 1 inspects a workpiece W by detecting light reflected by the workpiece W. Accordingly, a workpiece having a surface which reflects light may be applicable to the workpiece W.

As an example, a workpiece W has a surface which regularly reflects light. Such a surface is the surface of a mirror or the surface of glass, for example. Meanwhile, it is not necessary to limit the workpiece W such that the entire surface of the workpiece W regularly reflects light. Only a part to which light is radiated may regularly reflect the light. Further, if the present embodiment is applicable, the material of the workpiece W need not be limited. Reflected light from the surface of the workpiece W may include a diffused and reflected component in part thereof, and it is desirable that a regularly reflected component is sufficiently large with respect to a diffused and reflected component.

The image inspection apparatus 1 includes a camera 10 which is an example of an image capturing unit, an illumination device 20 which is an example of an illumination unit, and a control device 100 which is an example of a control unit configured to control the camera 10 and the illumination device 20.

The camera 10 captures an image of a workpiece W which is an object to generate a captured image of the workpiece W.

The illumination device 20 is disposed between the camera 10 and the workpiece W and has a light-emitting surface which radiates light to the workpiece W. The illumination device 20 is configured to be able to control a light-emitting position on the light-emitting surface and a radiation direction of light.

Further, the illumination device 20 has translucency. The camera 10 captures an image of the workpiece W over the illumination device 20. It is desirable that the illumination device 20 have a degree of translucency at which the camera 10 can capture an image of the workpiece W through the illumination device 20.

The illumination device 20 can change a radiation direction of light and an illumination pattern according to an instruction from the control device 100. Here, the camera 10 captures images of the workpiece W multiple times. Accordingly, the camera 10 acquires a plurality of captured images.

The illumination device 20 radiates light to the workpiece W while changing an illumination pattern in first illumination. Here, the camera 10 captures images of the workpiece W according to changes in the illumination pattern. Accordingly, a plurality of captured images 3 are generated. The control device 100 acquires the plurality of captured images 3 (first image acquisition).

The illumination device 20 radiates light to the workpiece W while changing an illumination pattern in second illumination. Meanwhile, the illumination patterns and changes therein are different in the first illumination and the second illumination. The camera 10 captures images of the workpiece W according to changes in the illumination pattern.

Accordingly, a plurality of captured images 5 are generated. The control device 100 acquires the plurality of captured images 5 (second image acquisition).

The control device 100 identifies a light-emitting position of the illumination device 20 and a radiation direction (illumination direction) of light when a measurement point of the surface of the workpiece W is illuminated from the captured images (the plurality of captured images 3 and the plurality of captured images 5) of the workpiece W. A "measurement point" is a position on the surface of the workpiece W, at which a distance from a light-emitting surface will be measured. The control device 100 calculates a distance between the light-emitting surface of the illumination device 20 and the measurement point on the basis of the identified light-emitting position and the illumination direction.

Figure 2:
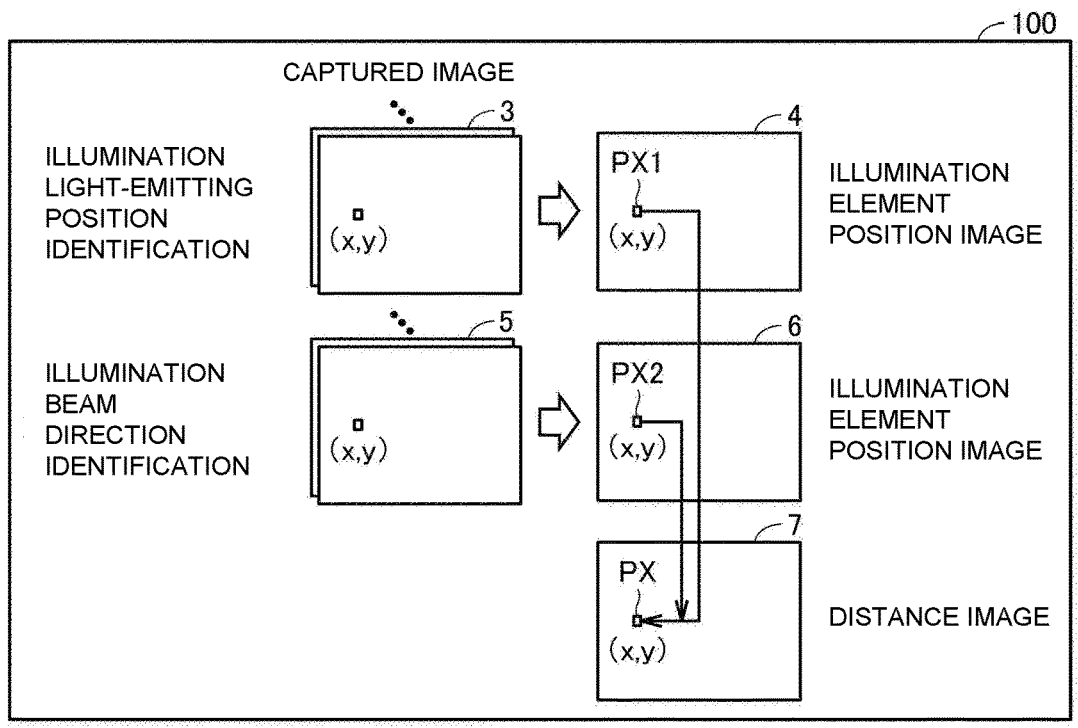
FIG. 2 is a schematic diagram for describing a process performed by a control device shown in FIG. 1.

FIG. 2 is a schematic diagram for describing a process performed by the control device shown in FIG. 1. As shown in FIG. 2, the control device 100 generates a data array from a plurality of captured images. In an example described below, the data array is a 2-dimensional array and takes the form of an image. The plurality of captured images have a plurality of pixels disposed in a 2-dimension. Accordingly, the same number of pixels as the number of captured images is acquired at each pixel position. The control device 100 selects one pixel from the plurality of pixels to generate an image which is a 2-dimensional data array. However, in the present embodiment, the data array is not limited to a data array composed of continuously arranged measurement points. The data array may be composed of discretely or locally arranged measurement points.

The control device 100 performs an illumination light-emitting position identification process and an illumination beam direction identification process. In the illumination light-emitting position identification process, the control device 100 generates an image (illumination element position image 4) having information about the position (light-emitting position) of an illumination element which contributes the most to illumination of the measurement point of the workpiece W from the plurality of captured images 3. A pixel PX1 positioned at a pixel position (x, y) is a pixel selected from pixels at the same pixel position (x, y) of the plurality of captured images 3. The pixel PX1 has information about a light-emitting position as a pixel value.

In the illumination beam direction identification process, the control device 100 generates an image (illumination direction image 6) having information about an illumination direction which contributes the most to illumination of the measurement point of the workpiece W from the plurality of captured images 5. A pixel PX2 positioned at a pixel position (x, y) is a pixel selected from pixels at the same pixel position (x, y) of the plurality of captured images 5. The pixel PX2 has information about an illumination direction as a pixel value. The position (x, y) of the pixel PX2 in the illumination direction image 6 is the same as the pixel position (x, y) in the pixel PX1 in the illumination element position image 4.

The control device 100 calculates a distance between the illumination device 20 and the workpiece W for each pixel on the basis of the illumination element position image 4 and the illumination direction image 6. Specifically, the control device 100 calculates a distance between the light-emitting surface of the illumination device 20 and the position (measurement point) of the surface of the workpiece W on the basis of information on the illumination position included in the pixel PX1 of the illumination element position image 4 and information on the illumination direction included in the pixel PX2 of the illumination direction image 6. The control device 100 generates a distance image 7 including a pixel PX having the calculated distance as a pixel value.

In this manner, the information included in the pixel PX1 of the illumination element position image 4 and the information included in the pixel PX2 at the same position as the pixel PX1 in the illumination direction image 6 are used in order to calculate the distance between the illumination device 20 and the surface of the workpiece W. The radiation direction (illumination direction) of light emitted from the illumination device 20 and the light-emitting position in the illumination device 20 are controllable. Accordingly, the control device 100 can have information about the light-emitting position and the illumination direction.

Further, the distance between the optical axis 11 of the camera 10 and the light-emitting position of the illumination device 20 is known. To obtain the distance between the optical axis 11 of the camera 10 and the light-emitting position of the illumination device 20, the position of the intersection of the optical axis 11 of the camera 10 and the light-emitting surface of the illumination device 20 is necessary. The position of the intersection is determined in advance according to alignment between the optical axis 11 of the camera 10 and the illumination device 20. Accordingly, it is possible to provide an image inspection apparatus and an image inspection method capable of inspecting an object by controlling a radiation angle of light.

B. Example of Production Line to which Image Inspection Apparatus is Applied

Figure 3:
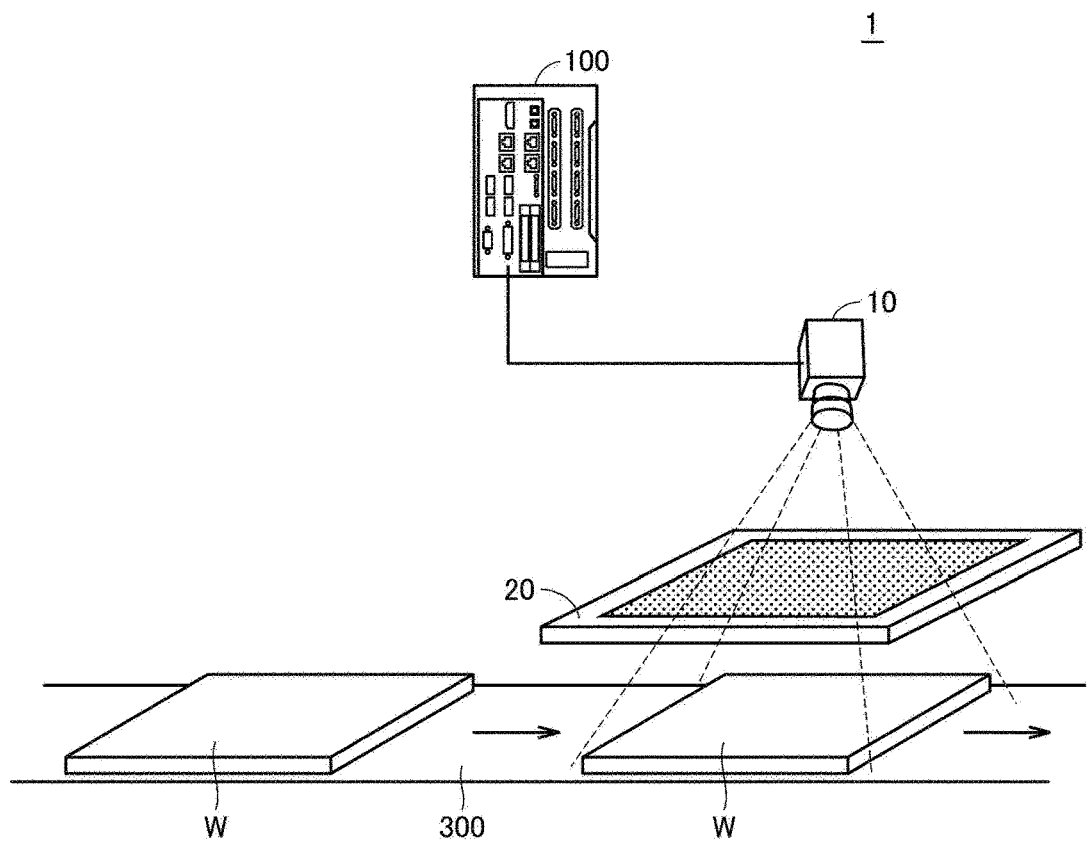
FIG. 3 is a schematic diagram showing an example of a production line to which the image inspection apparatus according to the present embodiment is applied.

Next, an example of a production line to which the image inspection apparatus 1 is applied will be described with reference to FIG. 3. FIG. 3 is a schematic diagram showing an example of a production line to which the image inspection apparatus 1 according to the present embodiment is applied. The image inspection apparatus 1 captures images of a workpiece W using the camera 10 while illuminating the workpiece W through the illumination device 20 and inspects the exterior of the workpiece W using the acquired captured images in a production line for industrial products, and the like. Specifically, the workpiece W which is an inspection target is moved by a movable stage 300 to an inspection position at which the camera 10 and the illumination device 20 are fixed. When the workpiece W is moved to the inspection position, the workpiece W remains still in that place until exterior inspection performed by the image inspection apparatus 1 ends. Here, the control device 100 captures images of the workpiece W using the camera 10 while illuminating the workpiece W through the illumination device 20 and displays the captured images on a monitor. Accordingly, an operator inspects the exterior of the workpiece W while viewing the colors of the captured images displayed on a monitor screen. Alternatively, the control device 100 may perform predetermined image processing on the captured images and perform abnormality determination with respect to the workpiece W on the basis of an image processing result.

For example, the control device 100 may include a processor such as a central processing unit (CPU) or a micro-processing unit (MPU), a random access memory (RAM), a display controller, a system controller, an input/ output (I/O) controller, a hard disk, a camera interface, an input interface, a light emission interface, a communication interface, and a memory card interface. These components are connected such that they can perform data communication centering around the system controller.

C. Example of Configuration of Illumination Device

Figure 4:
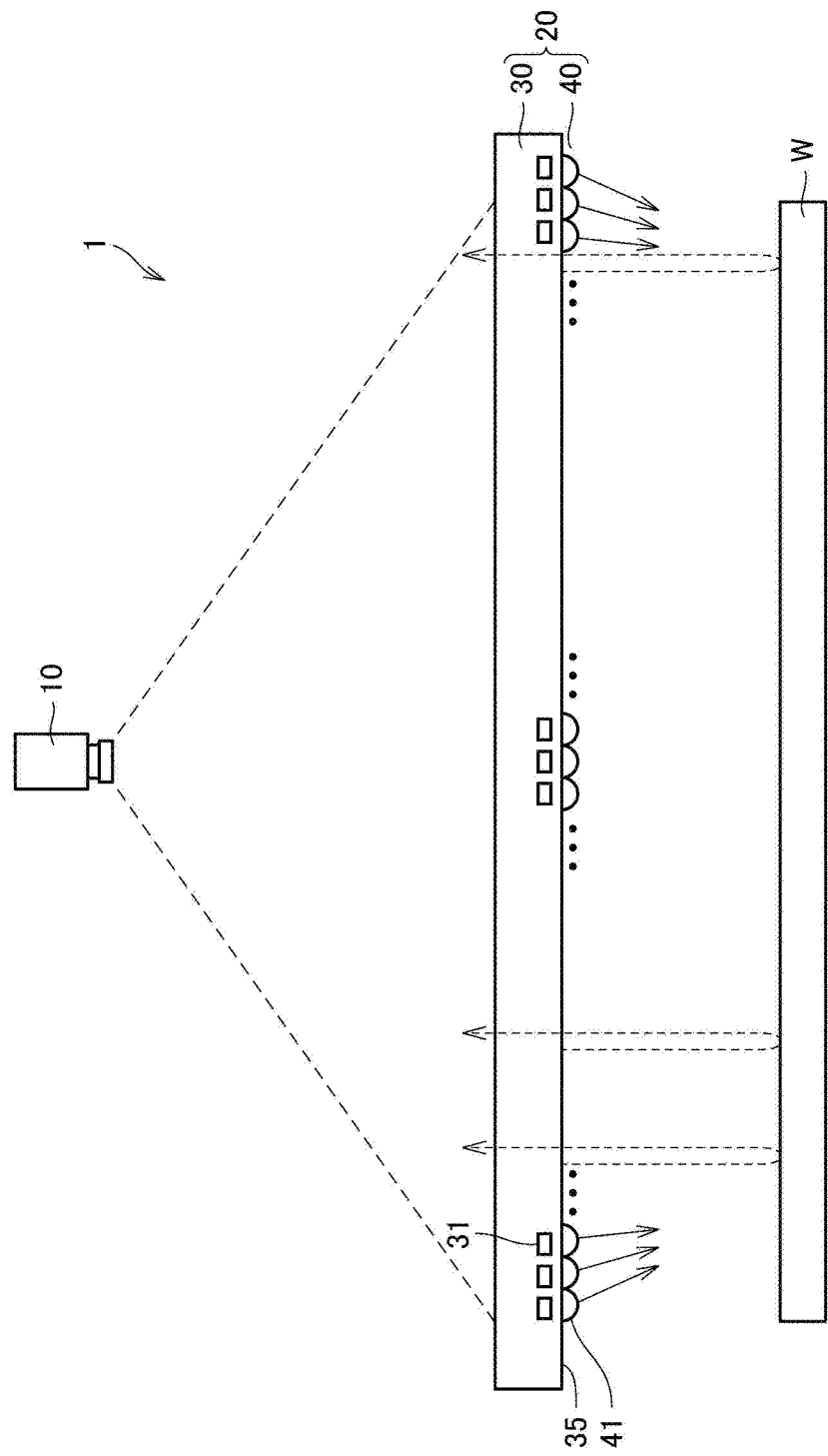
FIG. 4 is a diagram schematically showing a configuration of an illumination device included in the image inspection apparatus.

FIG. 4 is a diagram schematically showing a configuration of the illumination device included in the image inspection apparatus 1. The illumination device 20 is disposed between a workpiece W and the camera 10, radiates light to the workpiece W and has translucency. Accordingly, light radiated from the illumination device 20 is reflected by the workpiece W, is transmitted by the illumination device 20 and arrives at the camera 10.

The illumination device 20 includes a surface light source 30 and a micro-lens array 40 which is an example of an optical system. The surface light source 30 radiates light to the workpiece W from a light-emitting surface 35 at the side of the workpiece W. Light is radiated from a plurality of light-emitting regions arranged in a matrix form on the light-emitting surface 35 of the surface light source 30. Reflected light from the workpiece W is transmitted by a light-transmitting region other than the light-emitting regions in the surface light source 30.

Each light-emitting region includes a light-emitting unit 31. As an example, the light-emitting unit 31 includes a member configured according to organic electroluminescence (hereinafter referred to as organic EL). A plurality of light-emitting units 31 are configured to be able to selectively emit light. A light-emitting unit 31 which will emit light is selected by the control device 100 (refer to FIG. 1). As an example, the surface light source 30 is a light source using organic EL. However, any illumination device having translucency and a plurality of light-emitting units arranged in a matrix form and configured to selectively emit light is applicable to the present embodiment. That is, the illumination device 20 applicable to the present embodiment is not limited to a light source using organic EL.

The micro-lens array 40 is disposed to face the light-emitting surface 35 of the surface light source 30. The micro-lens array 40 includes a plurality of lenses 41 provided to face the plurality of light-emitting units 31. In an example, the lenses 41 are convex lenses. The lenses 41 are configured to guide light emitted from the light-emitting units 31 corresponding thereto in a desired direction. That is, the micro-lens array 40 is configured to control an illumination direction of each of the plurality of light-emitting units 31 to be a direction corresponding to the position of each light-emitting unit 31.

A radiation solid angle may be arbitrarily changed by selecting a light-emitting unit which will emit light from the plurality of light-emitting units 31. A light-emitting unit which will emit light is selected according to a place of a visual field. Accordingly, it is possible to realize the image inspection apparatus 1 capable of arbitrarily setting a radiation solid angle for each place of a visual field. Further, since the radiation solid angle can be arbitrarily changed, an optical part such as a slit or a half mirror, for example, can be unnecessary. Accordingly, the illumination device 20 can be reduced in size. Therefore, it is possible to realize the image inspection apparatus 1 which can set a radiation solid angle for each place of a visual field and can be reduced in size.

Figure 5:
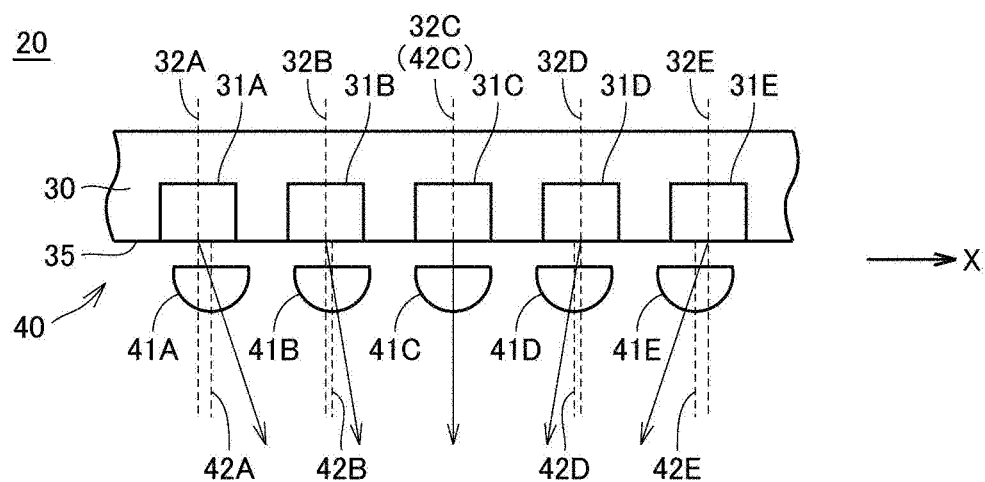
FIG. 5 is a schematic diagram showing a cross section of a part of an example of an illumination device according to the present embodiment.
Figure 6:
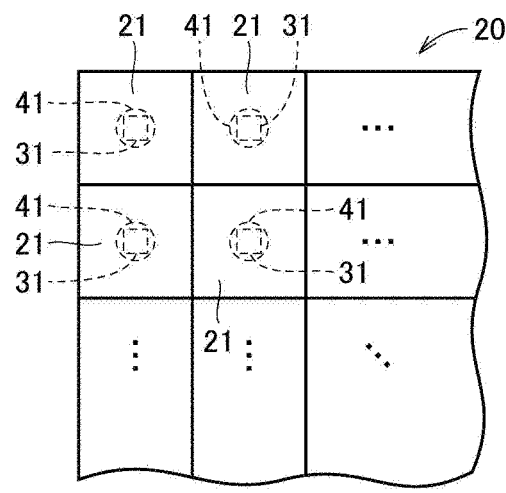
FIG. 6 is an enlarged schematic plan view of a part of the illumination device according to the present embodiment.

An example of the configuration of the illumination device according to the present embodiment will be described with reference to FIGS. 5 and 6. FIG. 5 is a schematic diagram showing a cross section of a part of an example of the illumination device according to the present embodiment. FIG. 6 is an enlarged schematic plan view of a part of the illumination device according to the present embodiment.

The illumination device 20 is a transmission type sheet illumination device and includes the surface light source 30 and the micro-lens array 40. The surface light source 30 is a light source using organic EL. The surface light source 30 includes a plurality of light-emitting units arranged in a matrix form along the light-emitting surface 35. FIG. 5 representatively shows light-emitting units 31A to 31E.

Each of the light-emitting units 31A to 31E has a pair of electrodes (not shown) facing each other. When a voltage is applied across the pair of electrodes, the light-emitting unit emits light. A light-emitting unit which will emit light may be selected by selecting an electrode pair to which a voltage will be applied from a plurality of electrode pairs. The color of light emitted from each of the light-emitting units 31A to 31E is not limited. For example, the plurality of light-emitting units 31 may emit light in the same color. Alternatively, light-emitting units capable of emitting light in different colors may be realized by combining a light-emitting unit which emits red light, a light-emitting unit which emits green light and a light-emitting unit which emits blue light.

The micro-lens array 40 includes a plurality of lenses 41 which are a plurality of micro-lenses arranged to face the plurality of light-emitting units 31. The plurality of lenses 41 are arranged in a matrix form along the light-emitting surface 35. FIG. 5 representatively shows lenses 41A to 41E facing the light-emitting units 31A to 31E. In an example, the lenses 41A to 41E are planoconvex lenses. The surfaces of the planoconvex lenses face the light-emitting surface 35. For example, the planoconvex lenses may be hemispherical lenses.

Each lens is for controlling a radiation direction of light emitted from the corresponding light-emitting unit. In an embodiment, in the lenses 41A to 41E, relative positions of the optical axes of the lenses with respect to the optical axes of light-emitting units are different. The direction of light emitted from a lens is determined according to a direction of deviation of the optical axis of the lens with respect to the optical axis of the corresponding light-emitting unit and a deviation amount. Meanwhile, in this embodiment, the optical axis of a light-emitting unit refers to an axis which penetrates the center point of a light-emitting region and is perpendicular to the light-emitting region and the optical axis of a lens refers to an axis which penetrates the center of the lens and is perpendicular to the principal plane of the lens. "Deviation amount" refers to a magnitude of deviation of the optical axis of a lens with respect to the optical axis of a light-emitting unit.

The optical axis 32C of the light-emitting unit 31C and the optical axis 42C of the lens 41C are substantially consistent with each other. The optical axis 42A of the lens 41A deviates from the optical axis 32A of the light-emitting unit 31A to the right on the paper (in the +X direction). Similarly, the optical axis 42B of the lens 41B also deviates from the optical axis 32B of the light-emitting unit 31B in the +X direction. A deviation amount with respect to the pair of the light-emitting unit 31A and the lens 41A is greater than that with respect to the pair of the light-emitting unit 31B and the lens 41B.

On the other hand, the optical axis 42D of the lens 41D deviates from the optical axis 32D of the light-emitting unit 31D to the left on the paper (in the −X direction). Similarly, the optical axis 42E of the lens 41E also deviates from the optical axis 32E of the light-emitting unit 31E in the −X direction. A deviation amount with respect to the pair of the light-emitting unit 31E and the lens 41E is greater than that with respect to the pair of the light-emitting unit 31D and the lens 41D.

As is understood from FIG. 5, it is possible to change a radiation solid angle by selectively causing any of the light-emitting units 31A to 31E shown in FIG. 5 to emit light. Since the radiation solid angle may be varied, restrictions on illumination patterns of the illumination device 20 are mitigated. In other words, it is possible to realize illumination based on an arbitrary pattern according to the illumination device 20.

As shown in FIG. 6, the illumination device 20 includes a plurality of illumination elements 21 arranged in a matrix form. That is, the illumination device 20 is sectioned into the plurality of illumination elements 21. Each illumination element 21 includes a plurality of light-emitting units 31 and a plurality of lenses 41. For example, each illumination element 21 may include the light-emitting units 31A to 31E and the lenses 41A to 41E shown in FIG. 5. FIG. 6 shows a single light-emitting unit 31 and a single lens 41 corresponding thereto included in each illumination element 21 for illustration.

Each illumination element 21 includes a light-emitting region and a transparent region. It is possible to cause the entire illumination element 21 to emit light by causing the transparent region to emit light. Meanwhile, each illumination element 21 has translucency by including the transparent region.

The illumination device 20 may independently turn on the plurality of illumination elements 21. An illumination pattern of the illumination device 20 is determined by illumination elements 21 including light-emitting units 31 which will emit light (i.e., illumination elements 21 to be turned on) among the plurality of illumination elements 21. In the illumination device 20 capable of changing the wavelength of light radiated from each illumination element 21, an illumination pattern may be determined by illumination elements 21 which are turned on among the plurality of illumination elements 21 and the wavelength of light radiated from each illumination element 21 which is turned on.

Figure 7:
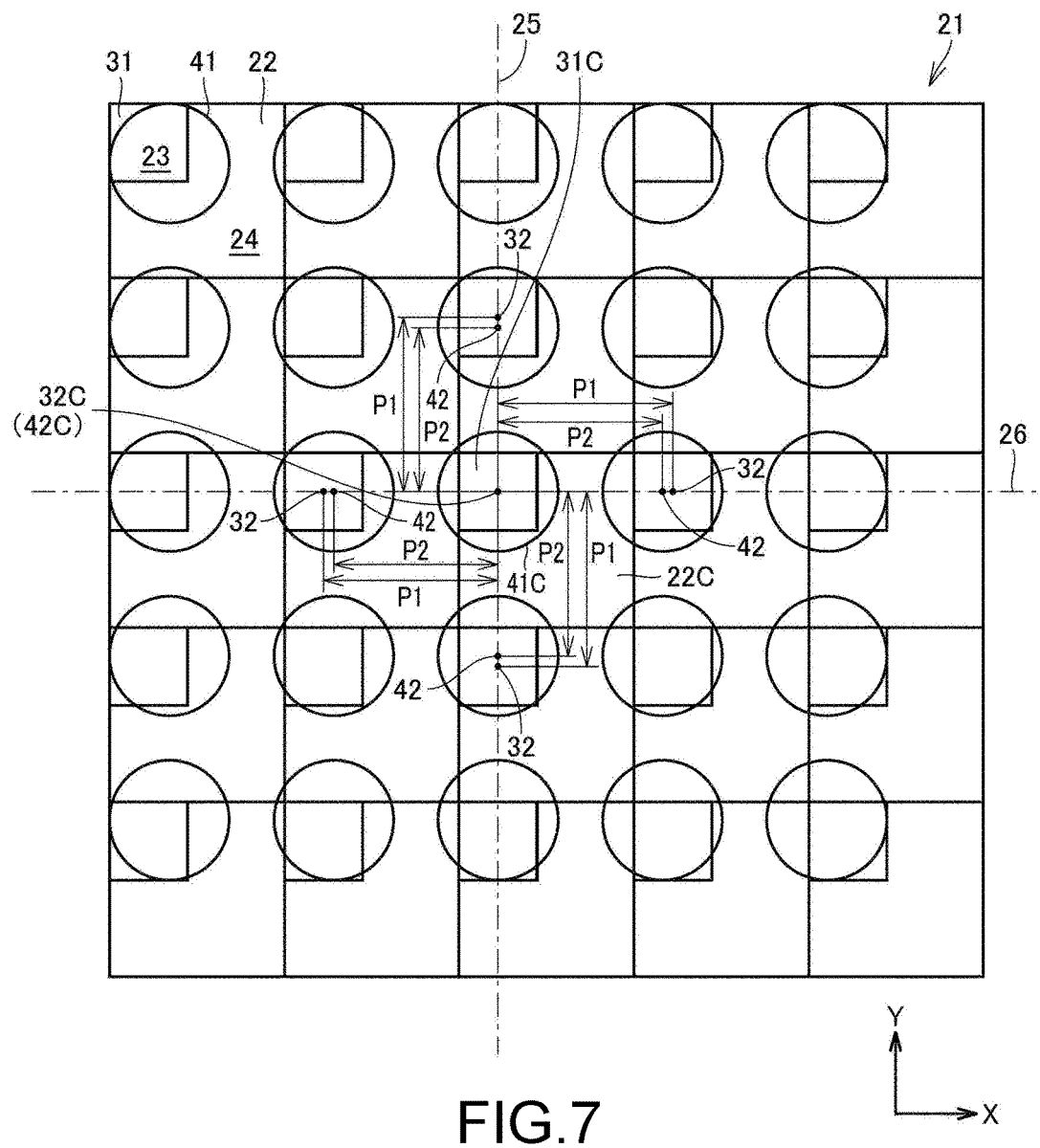
FIG. 7 is a plan view schematically showing an example of a structure of an illumination element which is a component of the illumination device.

FIG. 7 is a plan view schematically showing an example of a structure of an illumination element which is a component of the illumination device 20. FIG. 7 shows a planar view of the illumination element at the side of the image capturing unit (above the illumination device 20).

The illumination element 21 includes a plurality of cells 22 arranged in a matrix form. In the following description, "row" refers to an X direction and "column" refers to a Y direction. FIG. 7 shows the illumination element 21 composed of 25 cells 22 arranged in 5 rows and 5 columns (=5×5). However, the number of cells constituting the illumination element 21 is not particularly limited. For example, the illumination element 21 may be composed of 121 cells 22 arranged in 11 rows and 11 columns (=11×11). As the number of cells 22 increases, the resolution of an illumination direction of the illumination element 21 can increase but the resolution of a light-emitting position decreases. The number of cells 22 constituting the illumination element 21 can be determined by the resolution of an illumination direction and the resolution of a light-emitting position.

Each cell 22 includes a light-emitting unit 31, a lens 41 and a transparent region 24. A light-emitting surface of the light-emitting unit 31 constitutes a light-emitting region in the cell 22.

A plurality of light-emitting units 31 are arranged at a first pitch P1 in the X direction and the Y direction. A plurality of lenses 41 are arranged at a second pitch P2 in the X direction and the Y direction. Since the second pitch P2 is less than the first pitch P1 (P2<P1), a deviation amount in the X direction between the optical axis 32 of the light-emitting unit 31 and the optical axis 42 of the lens 41 conforms to an arithmetic progression of a tolerance (P1-P2) with respect to a plurality of cells 22 aligned in the X direction (row direction). Similarly, a deviation amount in the Y direction between the optical axis 32 of the light-emitting unit 31 and the optical axis 42 of the lens 41 conforms to the arithmetic progression of the tolerance (P1-P2) with respect to a plurality of cells 22 aligned in the Y direction (column direction).

The plurality of light-emitting units 31 and the plurality of lenses 41 are arranged symmetrically with respect to both the X axis and the Y axis. To explain this, axes 25 and 26 of symmetry are shown in FIG. 7. The axis 25 of symmetry is an axis for representing that the plurality of light-emitting units 31 and the plurality of lenses 41 are arranged symmetrically with respect to the X axis and is parallel with the Y direction. The axis 26 of symmetry is an axis for representing that the plurality of light-emitting units 31 and the plurality of lenses 41 are arranged symmetrically with respect to the Y axis and is parallel with the X direction.

In FIG. 7, a cell 22C is a cell positioned at the center of the illumination element 21. The cell 22C includes a light-emitting unit 31C and a lens 41C. The optical axis 32C of the light-emitting unit 31C and the optical axis 42C of the lens 41C overlap in the planar view. That is, both a deviation amount in the X direction and a deviation amount in the Y direction are 0 between the optical axis 32C and the optical axis 42C. Meanwhile, the optical axes 32C and 42C are positioned at the intersection of the axes 25 and 26 of symmetry.

In each cell in the illumination element 21, a deviation amount in the X direction and a deviation amount in the Y direction between the optical axis 32 of the light-emitting unit 31 and the optical axis 42 of the lens 41 are determined according to a distance in the X direction and a distance in the Y direction between the cell and the central cell 22C. Accordingly, it is possible to make a radiation direction of light different for the respective cells 22. The illumination element 21 may radiate light to a workpiece in a plurality of directions. Further, a radiation direction of light from the illumination element 21 may be controlled by selecting a cell to be turned on from the plurality of cells.

In the structure shown in FIG. 7, the pitch of the light-emitting units 31 is the same as the pitch of the lenses 41 in the X direction and the Y direction. However, the pitch of the light-emitting units 31 may be different in the X direction and the Y direction. Similarly, the pitch of the lenses 41 may be different in the X direction and the Y direction.

Figure 8:
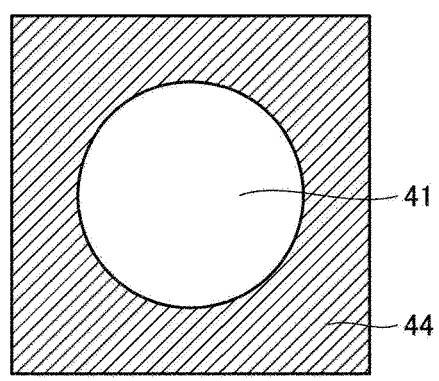
FIG. 8 is a schematic plan view showing a configuration for a countermeasure against light leaking from the edge of a lens.
Figure 9:
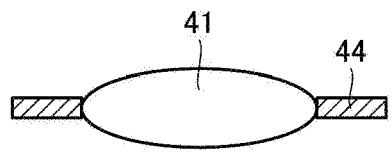
FIG. 9 is a schematic cross-sectional view of the configuration shown in FIG. 8.

When a deviation amount (displacement amount) of the optical axis 42 of the lens 41 with respect to the optical axis 32 of the light-emitting unit 31 is large, there is a possibility that a part of light emitted from the light-emitting unit 31 leaks from the edge of the lens 41. FIG. 8 is a schematic plan view showing a configuration for a measure for light leaking from the edge of the lens 41. FIG. 9 is a schematic cross-sectional view of the configuration shown in FIG. 8. As shown in FIGS. 8 and 9, a light-shielding part 44 may be provided to surround the edge of the lens 41. The light-shielding part 44 is formed of a material which does not pass light or a material which attenuates light. A possibility that light from the light-emitting unit 31 leaks in an unintended direction can be reduced according to the light-shielding part 44.

Figure 10:
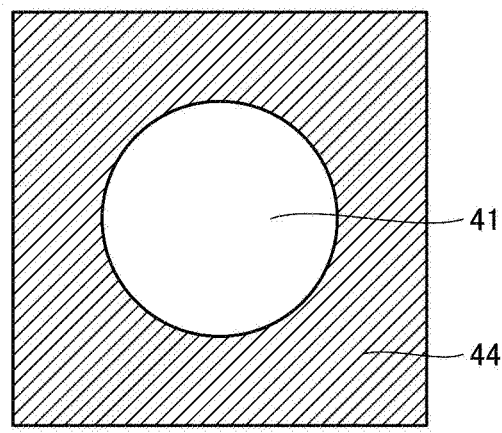
FIG. 10 is a schematic plan view showing a modified example of the configuration shown in FIG. 8.

FIG. 10 is a schematic plan view showing a modified example of the configuration shown in FIG. 8. In the example shown in FIG. 10, the area of the light-shielding part 44 is larger than that in the configuration shown in FIG. 8. Accordingly, a possibility that light from the light-emitting unit 31 leaks in an unintended direction can be further reduced.

Figure 11:
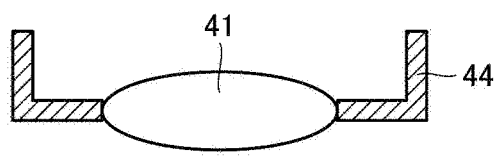
FIG. 11 is a schematic cross-sectional view showing another modified example of the configuration shown in FIG. 8.

FIG. 11 is a schematic cross-sectional view showing another modified example of the configuration shown in FIG. 8. In the example shown in FIG. 11, the light-shielding part 44 has a configuration of surrounding the edge of the lens 41 with a sufficient height in the direction of the height (thickness) of the lens 41 in addition to the configuration shown in FIG. 10. According to the configuration shown in FIG. 10, the effect of reducing light leaking from the edge of the lens 41 may be further improved.

D. Pattern Illumination for Acquiring Illumination Element Position Image

Figure 12:
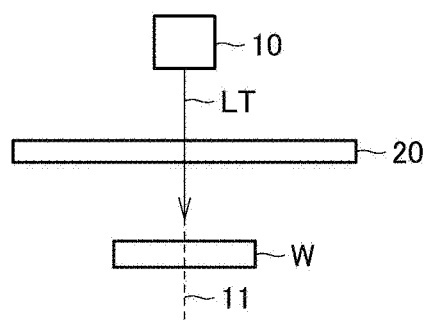
FIG. 12 is a diagram for describing pattern illumination for acquiring an illumination element position image.
Figure 13:
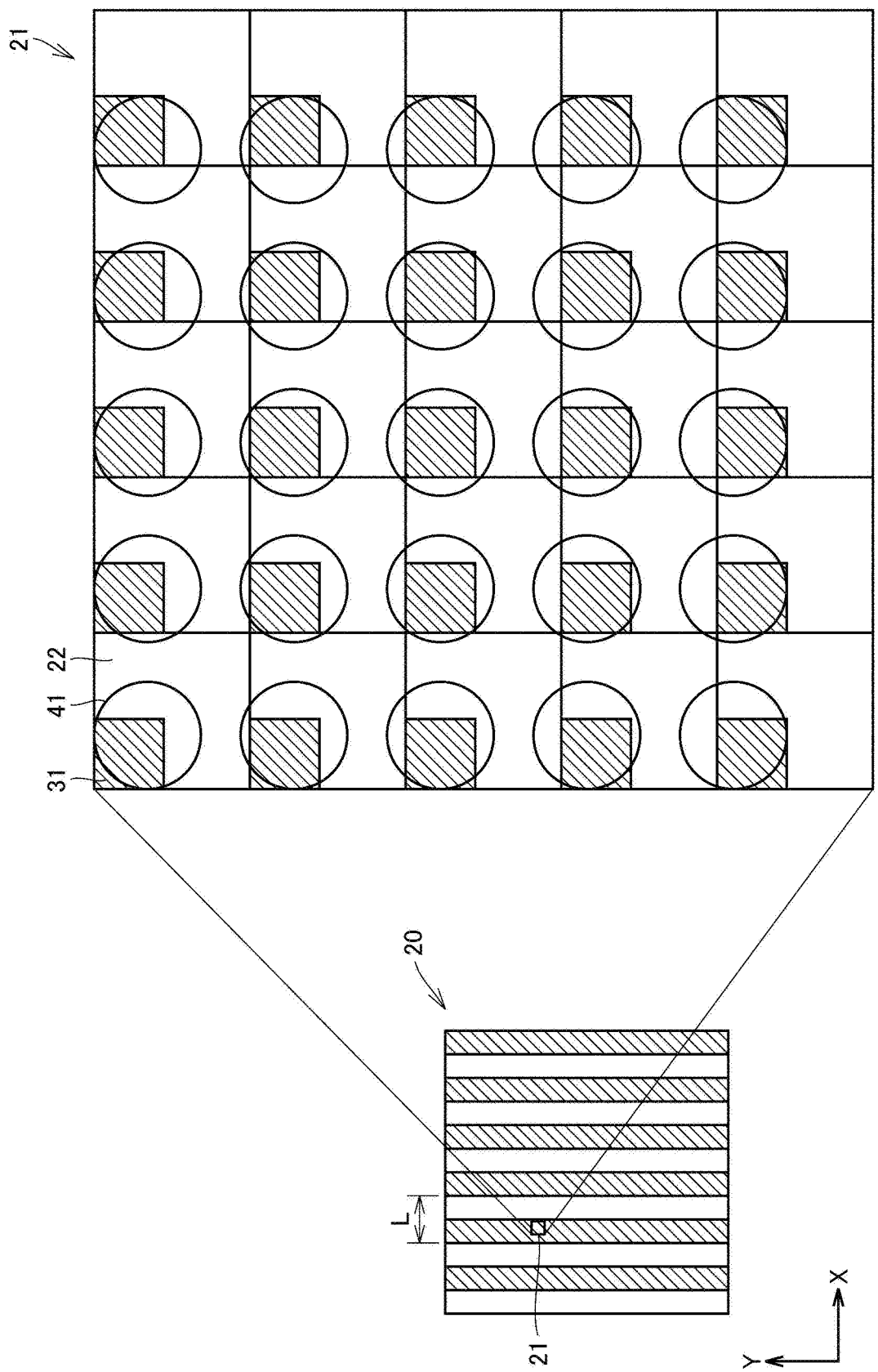
FIG. 13 is a diagram showing an example of the pattern illumination shown in FIG. 12.
Figure 14:
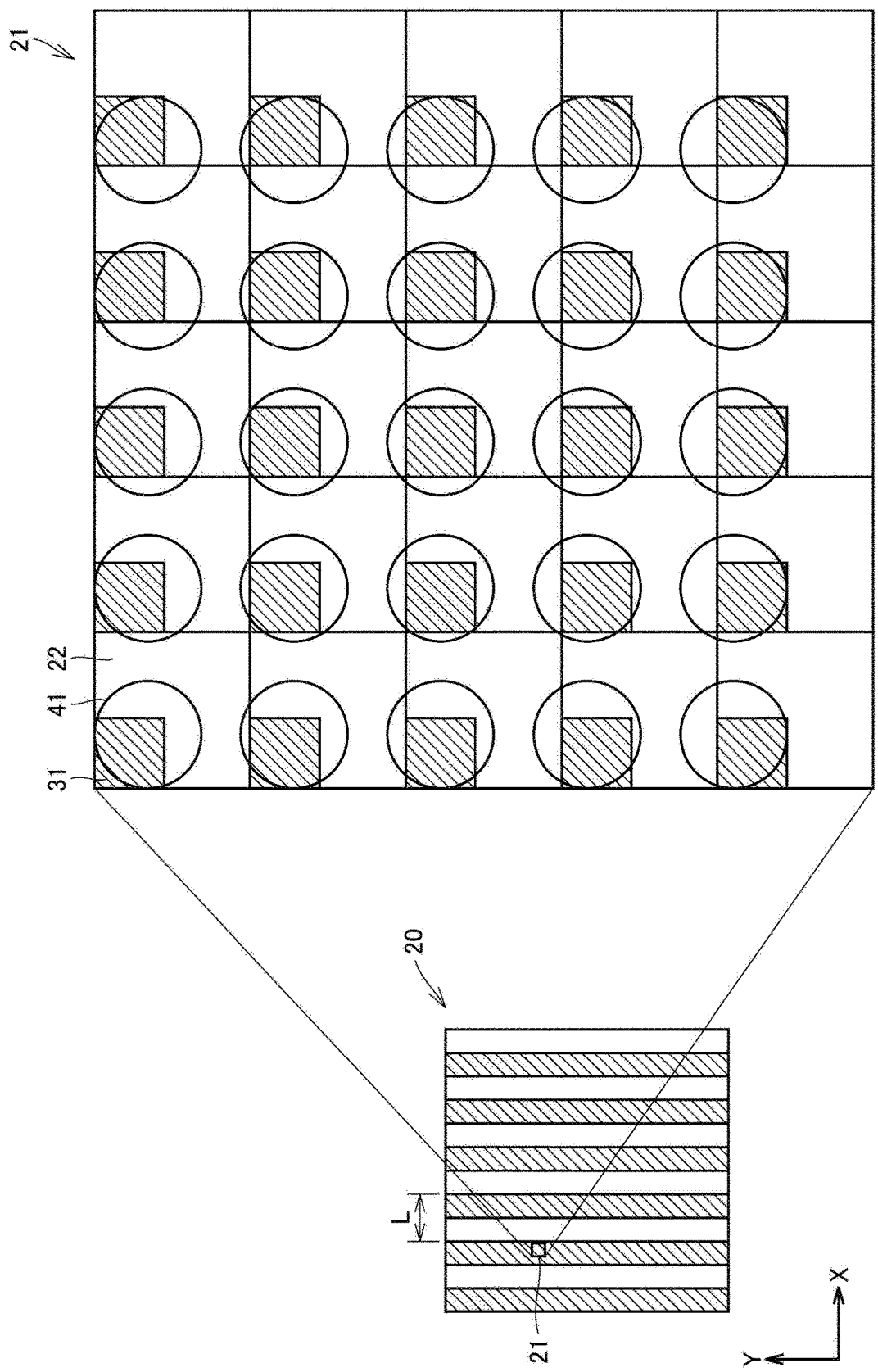
FIG. 14 is a diagram showing an example of pattern illumination changed from the pattern illumination shown in FIG. 13.

FIG. 12 is a diagram for describing pattern illumination for acquiring an illumination element position image. FIG. 13 is a diagram showing an example of pattern illumination shown in FIG. 12. FIG. 14 is a diagram showing an example of pattern illumination changed from the pattern illumination shown in FIG. 13.

Referring to FIGS. 12 to 14, the surface of a workpiece is inspected using a phase shift method in this embodiment. The illumination device 20 radiates light in a striped pattern to a workpiece W. In FIGS. 13 and 14, L represents the period of stripes.

The illumination device 20 radiates light in a striped pattern (light-and-shade pattern) to the workpiece W while changing the phase of the striped pattern. Accordingly, it is possible to generate a state equivalent to scanning the light in the striped pattern on the surface of the workpiece. For example, the illumination pattern is scanned in the X direction in the example shown in FIGS. 13 and 14.

Since the illumination pattern is a periodic pattern, the illumination device 20 may change the phase only by one period. The illumination pattern shown in FIG. 14 corresponds to a pattern obtained by inverting the phase of the striped pattern shown in FIG. 13 by 180°.

Figure 15:
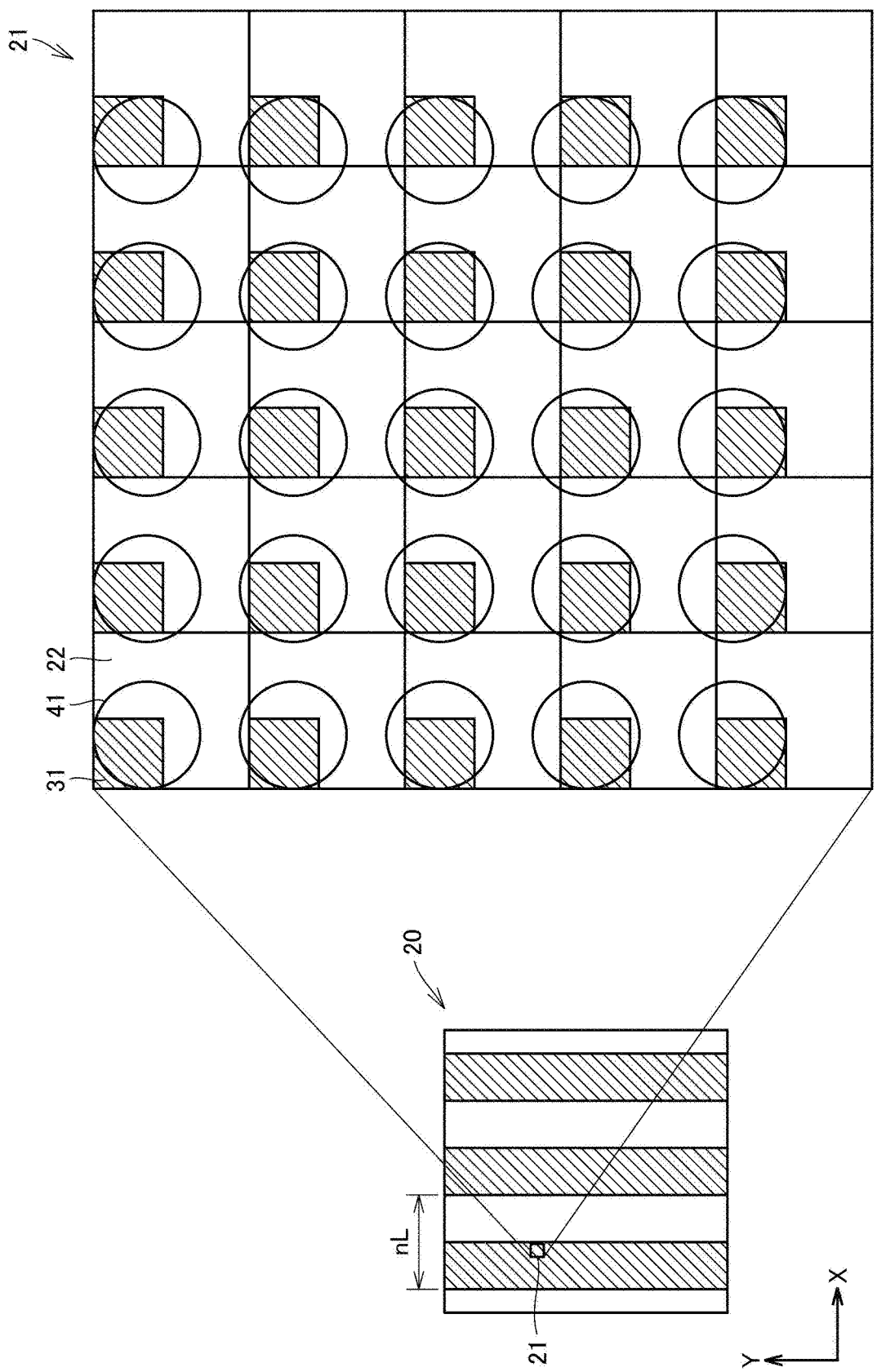
FIG. 15 is a diagram showing an example of variation of pattern illumination for acquiring an illumination element position image.

FIG. 15 is a diagram showing an example of a variation of pattern illumination for acquiring an illumination element position image. In the illumination pattern shown in FIG. 15, stripes have a period nL (=n×L; n is a natural number equal to or larger than 2). That is, when the illumination pattern shown in FIG. 15 is compared to the illumination pattern shown in FIG. 13 or 14, the period of stripes in the illumination pattern shown in FIG. 15 is n times that in the illumination pattern shown in FIG. 13 or 14.

Figure 16:
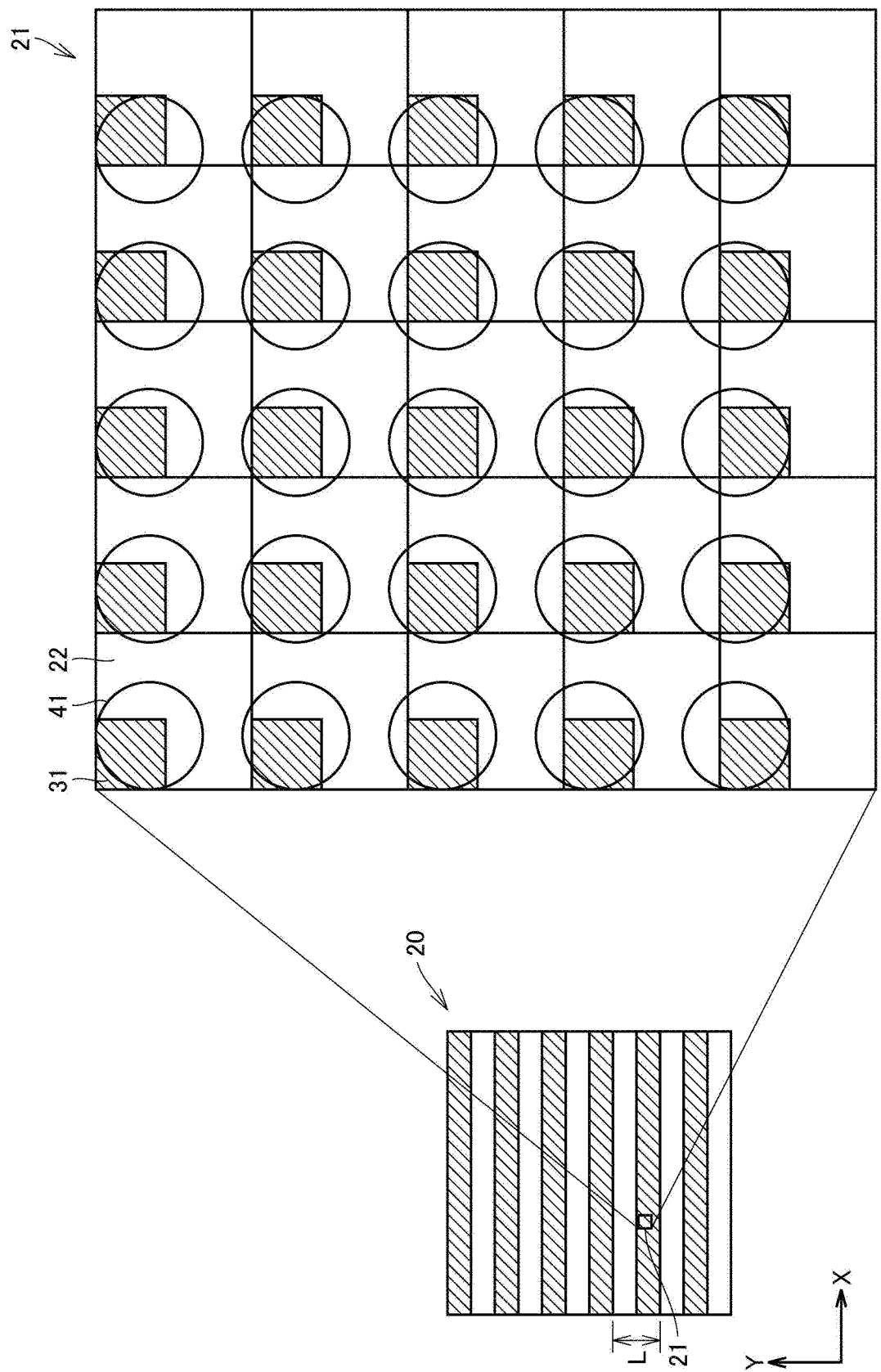
FIG. 16 is a diagram showing another example of variation of pattern illumination for acquiring an illumination element position image.

FIG. 16 is a diagram showing another example of a variation of pattern illumination for acquiring an illumination element position image. The illumination pattern shown in FIG. 16 corresponds to a pattern obtained by inverting the illumination pattern shown in FIG. 13 or 14 by 90°. Accordingly, stripes have a period nL in the illumination pattern shown in FIG. 16.

As shown in FIGS. 13 to 16, the illumination device 20 may control illumination elements which emit light among the plurality of illumination elements 21. Accordingly, the illumination device 20 can control a light-emitting position. Further, when an illumination element position image is acquired, all light-emitting units 31 emit light in an illumination element 21 to emit light. Accordingly, these illumination elements 21 radiate light to a workpiece W, so to speak, in all directions.

E. Pattern Illumination for Acquiring Illumination Direction Image

Figure 17:
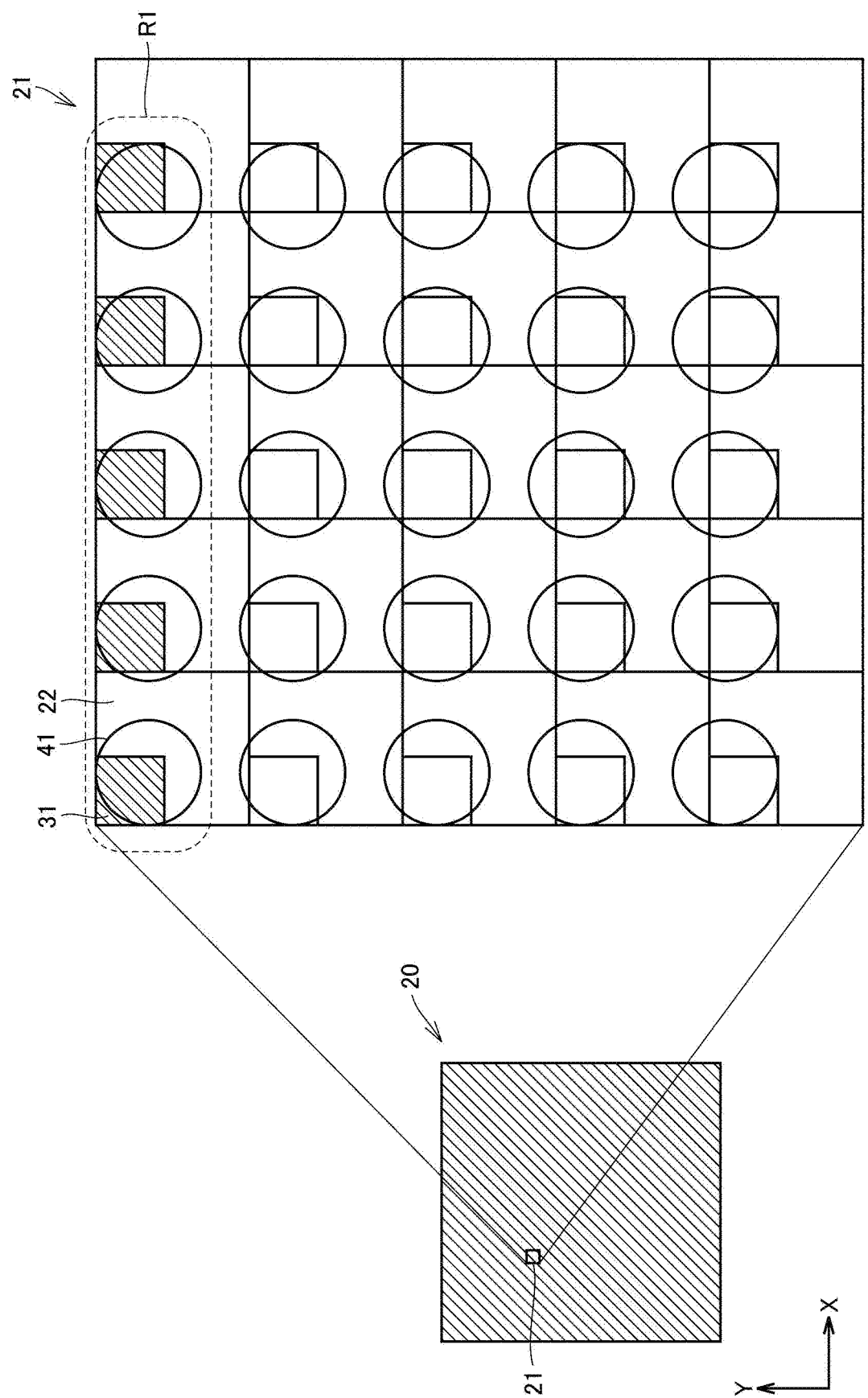
FIG. 17 is a diagram for describing an example of pattern illumination for acquiring an illumination element position image.

FIG. 17 is a diagram for describing an example of pattern illumination for acquiring an illumination element position image. As shown in FIG. 17, light-emitting units 31 disposed in a specific row (e.g., row R1) in a plurality of illumination elements 21 emit light in order to radiate light to a workpiece W in a predetermined direction.

Figure 18:
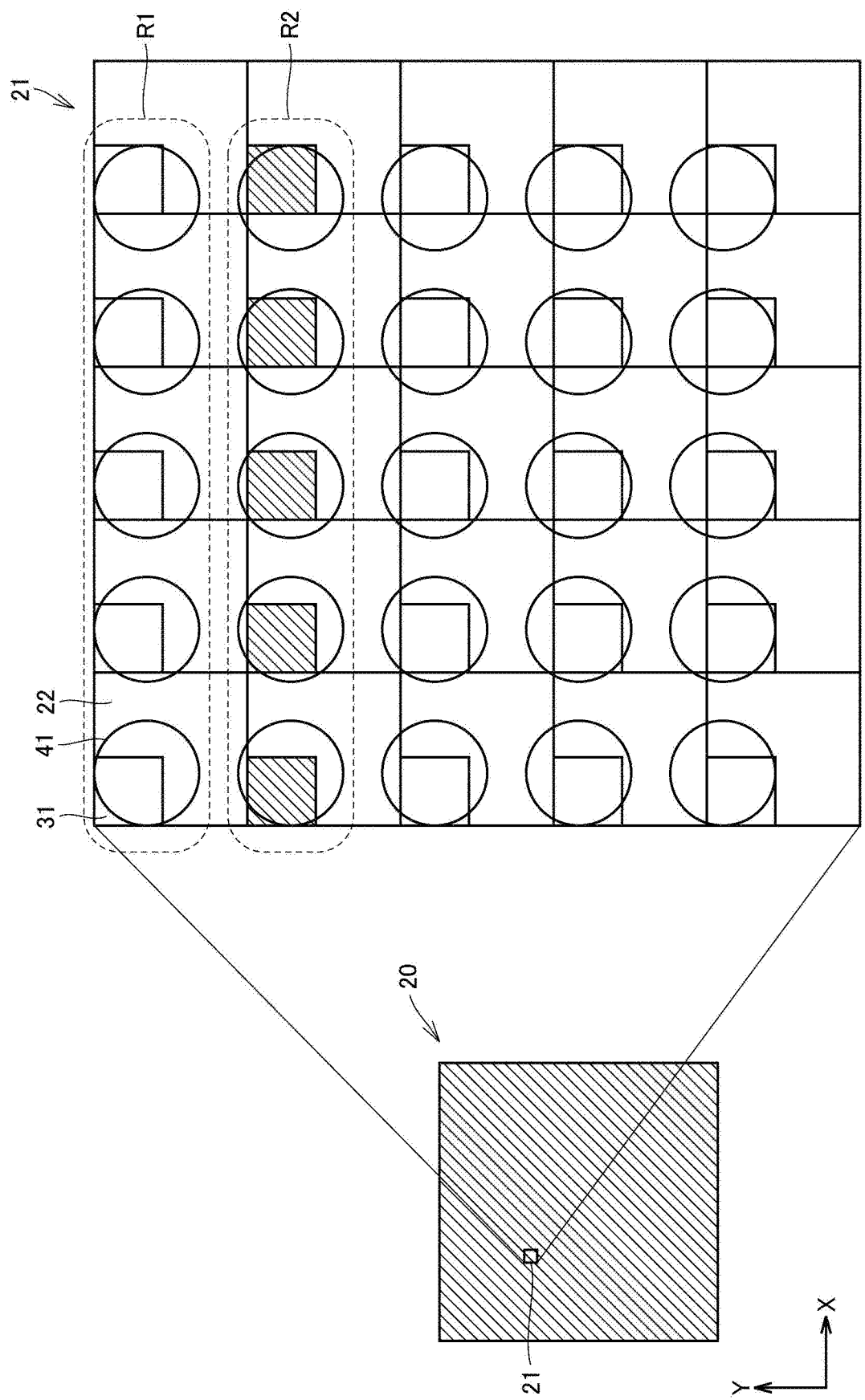
FIG. 18 is a diagram showing an example of pattern illumination changed from the pattern illumination shown in FIG. 17.
Figure 19:
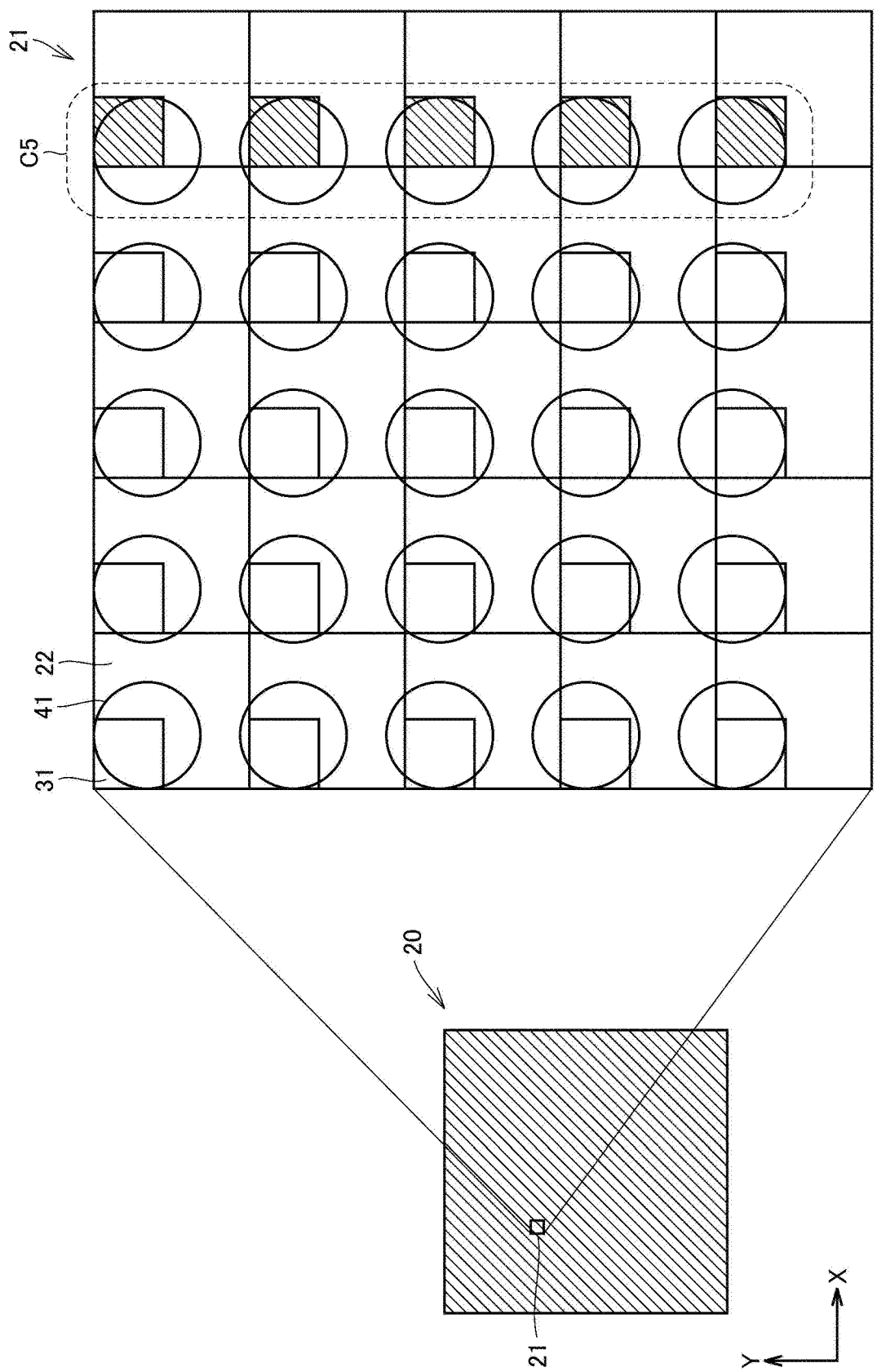
FIG. 19 is a diagram showing another example of pattern illumination changed from the pattern illumination shown in FIG. 17.

FIGS. 18 and 19 are diagrams showing examples of pattern illumination changed from the pattern illumination shown in FIG. 17. In the example shown in FIG. 18, light-emitting units disposed in a row R2 emit light. The row R2 is a row next to the row R1. As is understood with reference to FIGS. 7 and 18, a deviation of the optical axis of a lens with respect to the optical axis of a light-emitting unit has different magnitudes in the row R1 and the row R2. Accordingly, a radiation angle of light emitted from the light-emitting units 31 belonging to the row R2 differs from a radiation angle of light emitted from the light-emitting units 31 belonging to the row R1.

In the example shown in FIG. 19, light-emitting units disposed in a column C5 emit light. A position obtained by rotating the position of the row R1 by 90° with respect to the center of the illumination element 21 corresponds to the position of the column C5. Accordingly, the illumination direction of the light-emitting units 31 belonging to the column C5 corresponds to a direction obtained by rotating the illumination direction of the light-emitting units 31 belonging to the row R1 by 90° with respect to the center of the illumination element 21.

As shown in FIGS. 17 to 19, when an illumination direction image is acquired, the entire light-emitting surface (the entire region in which light can be emitted) of the illumination device 20 emits light. Accordingly, it is possible to illuminate the workpiece W in one direction. Further, the illumination device 20 can control (change) an illumination direction by selecting a row or a column including light-emitting units which will emit light in an illumination element 21.

F. Calculation of Distance

Figure 20:
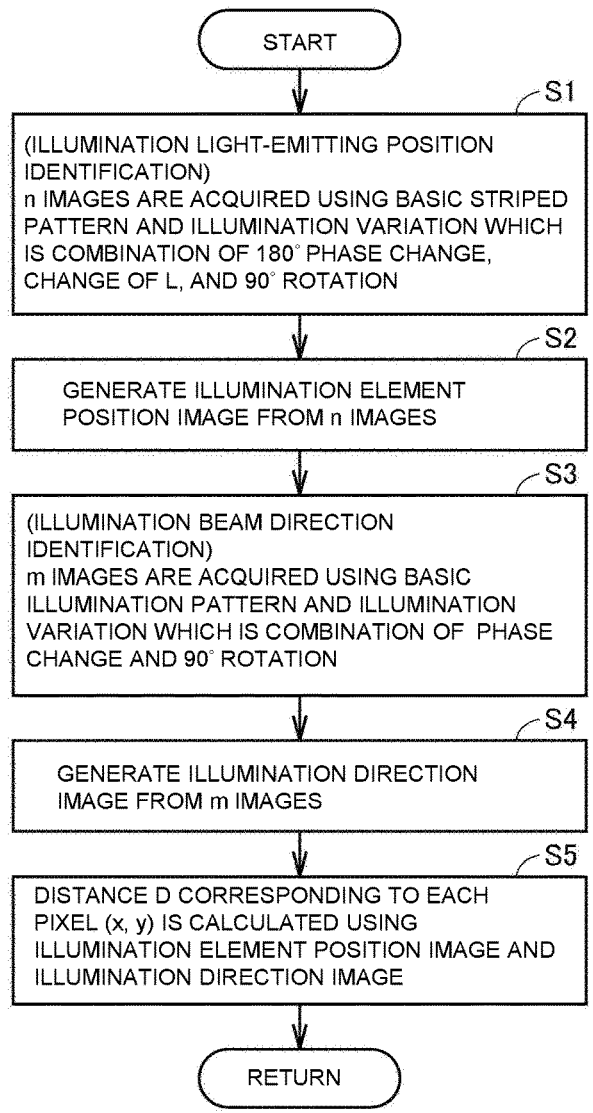
FIG. 20 is a flowchart showing a distance calculation method included in an inspection method according to the present disclosure.

FIG. 20 is a flowchart showing a distance calculation method included in an inspection method according to the present disclosure. The distance calculation method according to the present disclosure will be described below with reference to FIGS. 2 and 20. In step S1, an illumination light-emitting position identification process is performed. The illumination device 20 illuminates a workpiece W with a basic striped pattern (refer to FIG. 13). Further, the illumination device 20 illuminates the workpiece W using an illumination variation which is a combination of 180° phase change (refer to FIG. 14), change of the period L (refer to FIG. 15) and 90° rotation of the striped pattern (refer to FIG. 16). The camera 10 captures images of the workpiece W whenever pattern illumination is changed. Accordingly, n (n is an integer equal to or larger than 2) images (n captured images 3) are acquired. Meanwhile, the number n of captured images need not be the same as the multiple n of the period L shown in FIG. 15. "n" is used in order to refer to a plural.

In step S2, the control device 100 generates an illumination element position image 4 from the n images acquired through the process of step S1. Specifically, the control device 100 identifies a pixel having a maximum luminance among the n captured images for each pixel position (x, y). In addition, the control device 100 includes an illumination element position when the images are acquired in pixel information. Each pixel in the illumination element position image 4 has information on the position of an illumination element which provides a maximum luminance value as a pixel value.

In step S3, an illumination beam direction identification process is performed. The illumination device 20 illuminates the workpiece W with a basic illumination pattern (refer to FIG. 17). Further, the illumination device 20 illuminates the workpiece W using an illumination variation which is a combination of phase change (refer to FIG. 18) and 90° rotation (refer to FIG. 19). The camera 10 captures images of the workpiece W whenever pattern illumination is changed. Accordingly, m images are acquired. m is a natural number equal to or larger than 2.

In step S4, the control device 100 generates an illumination direction image 6 from the m images (m captured images 5) acquired through the process of step S3. Specifically, the control device 100 identifies a pixel having a maximum luminance among the m captured images for each pixel position (x, y) as in the process of step S2. In addition, the control device 100 includes an illumination direction when the images are acquired in pixel information. Each pixel in the illumination direction image 6 has information on an illumination direction in which a maximum luminance value is provided as a pixel value.

In step S5, the control device 100 calculates a distance D corresponding to a pixel of each set of coordinates (x, y) using a d1 image (illumination element position image 4) and a d2 image (illumination direction image 6). The distance D is a distance from the light-emitting surface 35 of the illumination device 20 to a measurement point on the surface of the workpiece W corresponding to the pixel of the coordinates (x, y).

Figure 21:
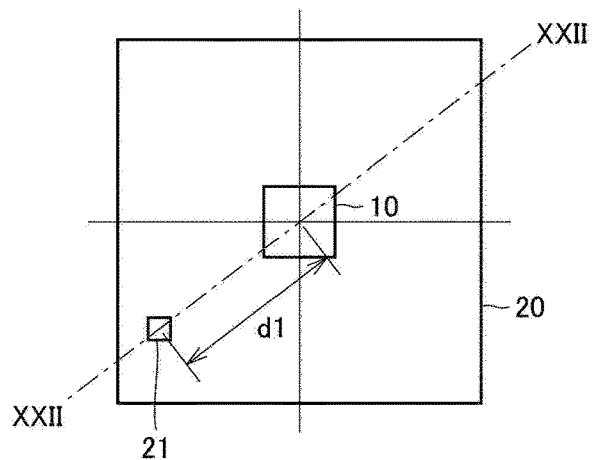
FIG. 21 is a top view for describing the principle of the distance calculation method according to this disclosure.
Figure 22:
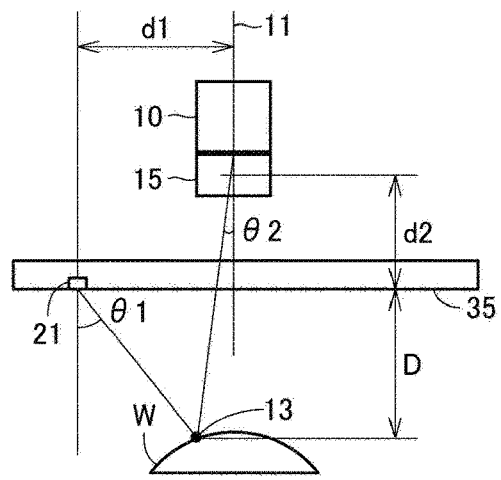
FIG. 22 is a schematic cross-sectional view along line XXII-XXII of FIG. 21.

FIG. 21 is a top view for describing the principle of the distance calculation method according to this disclosure. FIG. 22 is a schematic cross-sectional view along line XXII-XXII of FIG. 21. A measurement point 13 shown in FIGS. 21 and 22 corresponds to a position on the surface of the workpiece W which corresponds to the pixel of the coordinates (x, y). A pixel PX1 in the illumination element position image 4 and a pixel PX2 in the illumination direction image 6 are pixels corresponding to the measurement point 13.

A distance d1 is a distance from the optical axis 11 of the camera 10 to an illumination element 21. An angle $\theta 1$ represents an illumination direction of the illumination element 21. The angle $\theta 1$ is an angle formed by a radiation direction of light with respect to the normal of the light-emitting surface 35. An angle $\theta 2$ is an angle formed between a straight line 14 which corrects the center point of a lens 15 and the measurement point 14 and the optical axis 11 of the camera. A distance d2 is a distance from the center point of the lens 15 of the camera 10 to the light-emitting surface 35 of the illumination device 20.

The following equation (1) is derived from the relationship shown in FIGS. 21 and 22.

$$d1 = D \times \tan\theta 1 + (d2 + D) \times \tan\theta 2 \qquad (1)$$

When equation (1) is modified, the following equation (2) is derived.

$$D = (d1 - d2 \times \tan\theta 2)/(\tan\theta 1 + \tan\theta 2) \qquad (2)$$

Since the camera 10 and the illumination device 20 are aligned (calibrated) in advance, an optical positional relationship between the camera 10 and the illumination device is known. Accordingly, the distance d2 is known. Since the position of the optical axis 11 of the camera 10 is known, the angle $\theta 2$ is also known. The value of the distance d1 is included in the illumination element position image 4 as a pixel value of the pixel PX1. The value of the angle $\theta 1$ is included in the illumination direction image 6 as a pixel value of the pixel PX2. Accordingly, the control device 100 may calculate the distance D from the information included in the illumination element position image 4 and the illumination direction image 6.

Three-dimensional shape measurement of a workpiece having a free-form mirror surface is not easy, in general. For example, a method of projecting a striped pattern and estimating a shape from distortion thereof, such as the phase shift method, is proposed. However, information which can be directly acquired is normal information on a target surface and distance information cannot be directly obtained. Although there is a method of estimating a distance using integration, a large error is generated when continuity of a target surface is not guaranteed. On the other hand, according to this disclosure, a three-dimensional shape of a workpiece having a free-form mirror surface can be directly measured. Accordingly, a distance can be obtained with high accuracy even when continuity of a target surface is not guaranteed.

Meanwhile, in identification of an illumination light-emitting position, each illumination element may be independently turned on as a simplest example, for example. Using a striped pattern entails application of a so-called space code method. It is possible to reduce the number of times image capturing is performed by using a striped pattern.

In addition, in identification of an illumination light-emitting position, illumination elements in a specific direction may be independently turned on as a simplest example, for example. Scanning light using a line pattern is for the purpose of reducing the number of times image capturing is performed. As another example, a workpiece W may be illuminated using a striped pattern as in illumination light-emitting position identification. In this case, the number of times image capturing is performed can be further reduced compared to a line pattern.

Furthermore, in the above-described disclosure, a distance is calculated by performing processes of two steps of the illumination light-emitting position identification process and the illumination beam direction identification process. As another simplest method, for example, only light-emitting units in an arbitrary illumination direction of an arbitrary illumination element may be independently turned on and which pixels are lit by the light-emitting units may be checked. This method can be employed if the number of times image capturing is performed is not limited. The number of times image capturing is performed can be reduced by performing the processes of the aforementioned two steps.

In the above-described disclosure, a distance can be calculated for all pixels included in an image. However, a distance may be calculated for only a specific region in an image, for example. In this case, a calculation time can be reduced compared to cases in which a distance is calculated for all pixels.

G. Modified Example of Configuration of Illumination Device

Figure 23:
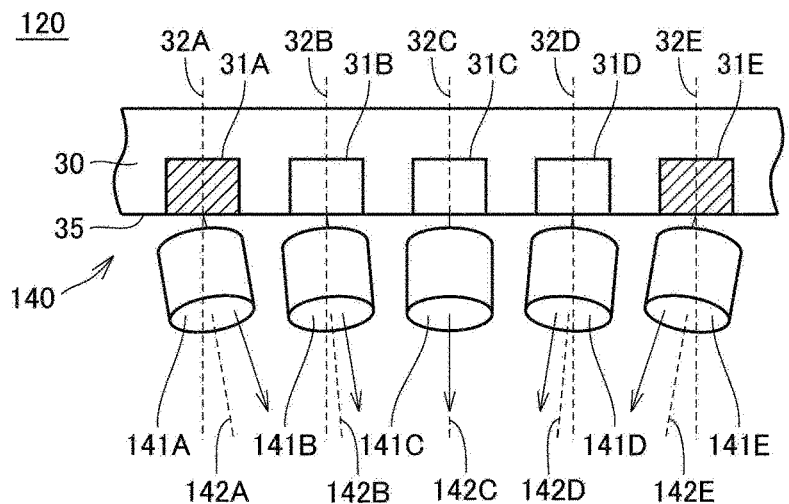
FIG. 23 is a schematic diagram showing a cross section of a part of an illumination device according to modified example 1.

FIG. 23 is a schematic diagram showing a cross section of a part of an illumination device 120 according to modified example 1. Compared to the illumination device 20 shown in FIG. 3, the illumination device 120 includes a micro-lens array 140 instead of the micro-lens array 40. The micro-lens array 140 includes a plurality of lenses 141 which are a plurality of micro-lenses disposed to respectively face a plurality of light-emitting units 31. FIG. 23 representatively shows lenses 141A to 141E facing light-emitting units 31A to 31E.

Each of the lenses 141A to 141E is a rod lens. In the lenses 141A to 141E, angles of the optical axes (optical axes 142A to 142E) of the lenses to the optical axes (optical axes 32A to 32E) of the light-emitting units 31 are different. It is possible to change emission angles (angles to the optical axes of the lenses) of light emitted from emission surfaces of the rod lenses by changing incident angles of light to incident surfaces of the rod lenses. Accordingly, an emission direction of light can be changed for each light-emitting unit in the illumination device 120. It is possible to increase a distance between a workpiece W and the illumination device 120, in which the shape of the workpiece W can be inspected by using rod lenses.

Figure 24:
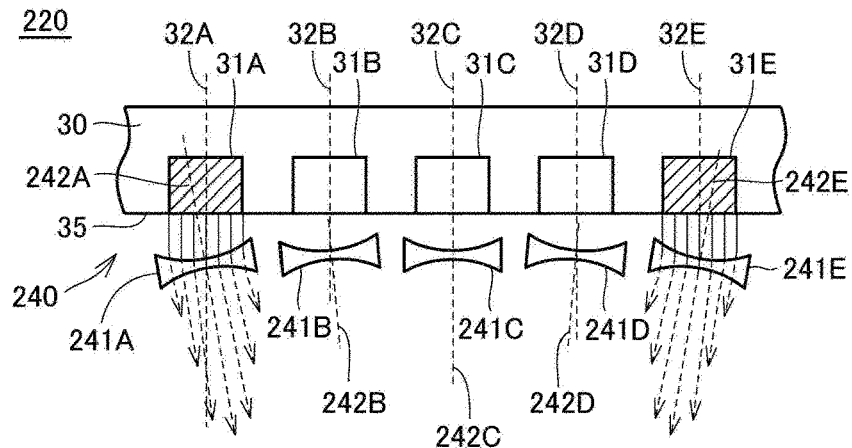
FIG. 24 is a schematic diagram showing a cross section of a part of an illumination device according to modified example 2.

FIG. 24 is a schematic diagram showing a cross section of a part of an illumination device 220 according to modified example 2. Compared to the illumination device 20 shown in FIG. 3, the illumination device 220 includes a micro-lens array 240 instead of the micro-lens array 40. The micro-lens array 240 includes a plurality of lenses 241 which are a plurality of micro-lenses disposed to respectively face a plurality of light-emitting units 31. FIG. 24 representatively shows lenses 241A to 241E facing light-emitting units 31A to 31E.

Each of the lenses 241A to 241E is a concave lens. As in the modified example shown in FIG. 24, in the lenses 241A to 241E, angles of the optical axes of the lenses to the optical axes of the light-emitting units 31 are different. It is possible to change emission angles (angles to the optical axes of the lenses) of light emitted from the concave lenses by changing angles of the optical axes (optical axes 242A to 242E) of the lenses to the optical axes (optical axes 32A to 32E) of the light-emitting units.

Figure 25:
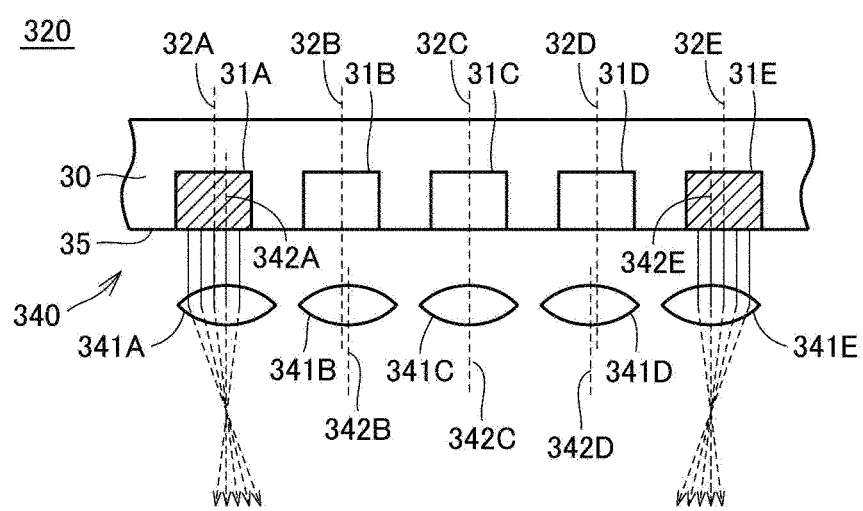
FIG. 25 is a schematic diagram showing a cross section of a part of an illumination device according to modified example 3.

FIG. 25 is a schematic diagram showing a cross section of a part of an illumination device 320 according to modified example 3. Compared to the illumination device 20 shown in FIG. 3, the illumination device 320 includes a micro-lens array 340 instead of the micro-lens array 40. The micro-lens array 340 includes a plurality of lenses 341 which are a plurality of micro-lenses disposed to respectively face a plurality of light-emitting units 31. FIG. 25 representatively shows lenses 341A to 341E facing light-emitting units 31A to 31E.

In modified example 3, the lenses 41A to 41E in the configuration of FIG. 3 are substituted by the lenses 341A to 341E and the optical axes 42A to 42E are substituted by optical axes 342A to 342E. Each of the lenses 341A to 341E is a convex lens. However, the shape of each of the lenses 341A to 341E differs from the shapes of the lenses 41A to 41E. As in the example shown in FIG. 3, it is possible to control radiation directions of light emitted from light-emitting units through the lenses by changing relative positions of the optical axes (optical axes 342A to 342E) of the lenses with respect to the optical axes (optical axes 32A to 32E) of the light-emitting units.

In the illumination devices shown in FIGS. 23 and 24, illumination elements include a plurality of cells 22 arranged in a matrix form. It is possible to change inclination angles of the optical axes of the lenses to the optical axes of the light-emitting units according to positions of the cells in the plurality of cells 22. Further, the angle of the optical axis of a lens to the X axis and the angle of the optical axis of a lens to the Y axis may be different for each cell.

In addition, the light-shielding part 44 (refer to FIGS. 8 to 11) may be provided at the edges of the lenses in the micro-lens arrays 140, 240 and 340 shown in FIGS. 23 to 25.

H. Supplementary Notes

As described above, the present embodiment includes the following disclosure.

(Configuration 1)

An image inspection apparatus including:

an image capturing unit 10 which captures images of an object W;

a transparent illumination unit 20, 120, 220 and 320 which is disposed between the object W and the image capturing unit 10, has a light-emitting surface 35 which radiates light to the object W and is configured to be able to control a light-emitting position on the light-emitting surface 35 and a radiation direction of the light; and a control unit 100 which is configured to control the image capturing unit 10 and the illumination unit 20, 120, 220 and 320, wherein the control unit 100 causes the illumination unit 20, 120, 220 and 320 to change the light-emitting position and the radiation direction, causes the image capturing unit 10 to capture images of the object W, identifies a light-emitting position and a radiation direction of the illumination unit 20, 120, 220 and 320 when a measurement point 13 of the surface of the object W is illuminated from images of the object W, and calculates a distance D to the measurement point 13 on the basis of the identified light-emitting position and the identified radiation direction.

(Configuration 2)

In the image inspection apparatus described in configuration 1, the image capturing unit 10 captures images of the object W multiple times to generate a plurality of first captured images 3 when the illumination unit 20, 120, 220 and 320 illuminates the object W while changing the light-emitting position, the image capturing unit 10 captures images of the object W multiple times to generate a plurality of second captured images 5 when the illumination unit 20, 120, 220 and 320 illuminates the object W while changing the radiation direction, and the control unit 100 generates a first data array 4 having information about the light-emitting position for illuminating the measurement point 13 of the object W from the plurality of first captured images 3, generates a second data array 6 having information about the radiation direction for illuminating the measurement point 13 of the object W from the plurality of second captured images 5, and calculates the distance D from the information on the light-emitting position included in the first data array 4 and the information on the radiation direction included in the second data array 6.

(Configuration 3)

In the image inspection apparatus described in configuration 2, the illumination unit 20, 120, 220 and 320 includes a plurality of illumination elements 21 disposed in a matrix form, wherein each of the plurality of illumination elements 21 includes a plurality of light-emitting units 31 and 31A to 31E arranged in a matrix form and configured to be able to selectively emit light, and an optical system 40, 140, 240 and 340 configured to control a radiation direction of light emitted from each of the plurality of light-emitting units 31 and 31A to 31E to be a direction corresponding to the position of each of the plurality of light-emitting units 31 and 31A to 31E, wherein the control unit 100 radiates light in a striped pattern to the object W by controlling turning on and turning off of each of the plurality of illumination elements 21 of the illumination unit 20, 120, 220 and 320 and changes the light-emitting position by changing any of the phase of the striped pattern, the period of stripes of the striped pattern and the direction of the stripes, and the control unit 100 changes the radiation direction by controlling turning on and turning off of the plurality of light-emitting units 31 and 31A to 31E of each of the plurality of illumination elements 21 of the illumination unit 20, 120, 220 and 320.

(Configuration 4)

In the image inspection apparatus described in configuration 3, the optical system 40, 140, 240 and 340 includes a plurality of micro-lenses 41, 41A to 41E, 141A to 141E, 241A to 241E and 341A to 341E provided to respectively face the plurality of light-emitting units 31 and 31A to 31E.

(Configuration 5)

In the image inspection apparatus described in configuration 4, the plurality of micro-lenses 41, 41A to 41E, 141A to 141E, 241A to 241E and 341A to 341E are disposed such that optical axes 42, 42A to 42E, 142A to 142E, 242A to 242E and 342A to 342E of at least some of the micro-lenses deviate from optical axes 32, 32A to 32E of light-emitting units 31 and 31A to 31E facing the at least some of the micro-lenses.

(Configuration 6)

In the image inspection apparatus described in configuration 5, in at least one of the plurality of illumination elements 21, the at least some micro-lenses 41, 41A to 41E, 341A to 341E are disposed at a pitch P2 less than a pitch P1 of the light-emitting units 31 and 31A to 31E.

(Configuration 7)

In the image inspection apparatus described in configuration 4, the plurality of micro-lenses 141A to 141E and 241A to 241E are disposed such that the optical axes 142A to 142E and 242A to 242E of at least some of the plurality of micro-lenses 141A to 141E and 241A to 241E are inclined with respect to the optical axes 32 and 32A to 32E of light-emitting units 31 and 31A to 31E facing the at least some of the micro-lenses.

(Configuration 8)

In the image inspection apparatus described in any of configurations 4 to 7, the illumination unit 20, 120, 220 and 320 further includes a light-shielding part 44 configured to shield light leaking from the edge of each of the plurality of micro-lenses among lights emitted from the plurality of light-emitting units 31 and 31A to 31E.

(Configuration 9)

An image inspection method performed by an image inspection apparatus including: an image capturing unit 10 which captures images of an object W; a transparent illumination unit 20, 120, 220 and 320 which is disposed between the object W and the image capturing unit 10, has a light-emitting surface 35 which radiates light to the object W and is configured to be able to control a light-emitting position on the light-emitting surface 35 and a radiation direction of the light; and a control unit 100 which is configured to control the image capturing unit 10 and the illumination unit 20, 120, 220 and 320, the image inspection method including:

a step S1 and S3 in which the illumination unit 20, 120, 220 and 320 changes the light-emitting position and the radiation direction and the image capturing unit 10 captures images of the object W;

a step S2 and S4 of identifying a light-emitting position and a radiation direction of the illumination unit 20, 120, 220 and 320 when a measurement point 13 of the surface of the object W is illuminated from images of the object W acquired in the step S1 and S3 of capturing images; and a step S5 of calculating a distance D to the measurement point 13 on the basis of the identified light-emitting position and the identified radiation direction.

(Configuration 10)

In the image inspection method described in configuration 9, the step S1 and S3 of capturing images includes:

a step S1 of capturing images of the object W multiple times to generate a plurality of first captured images 3 when the illumination unit 20, 120, 220 and 320 illuminates the object W while changing the light-emitting position; and a step S3 of capturing images of the object W multiple times to generate a plurality of second captured images 5 when the illumination unit 20, 120, 220 and 320 illuminates the object W while changing the radiation direction, and the step S2 and S4 of identifying the light-emitting position and the radiation direction includes:

a step S2 of generating a first data array 4 having information about the light-emitting position for illuminating the measurement point 13 of the object W from the plurality of first captured images 3; and a step S4 of generating a second data array 6 having information about the radiation direction for illuminating the measurement point 13 of the object W from the plurality of second captured images 5, and the step S5 of calculating includes a step of calculating the distance D from the information on the light-emitting position included in the first data array 4 and the information on the radiation direction included in the second data array 6.

(Configuration 11)

In the image inspection method described in configuration 9 or 10, the illumination unit 20, 120, 220 and 320 includes a plurality of illumination elements 21 disposed in a matrix form, wherein each of the plurality of illumination elements 21 includes a plurality of light-emitting units 31 and 31A to 31E arranged in a matrix form and configured to be able to selectively emit light, and an optical system 40, 140, 240 and 340 configured to control a radiation direction of light emitted from each of the plurality of light-emitting units 31 and 31A to 31E to be a direction corresponding to the position of each of the plurality of light-emitting units 31 and 31A to 31E, wherein the step in which the illumination unit 20, 120, 220 and 320 changes the light-emitting position and the radiation direction includes:

a step of radiating light in a striped pattern to the object W by controlling turning on and turning off of each of the plurality of illumination elements 21 of the illumination unit 20, 120, 220 and 320 and changing the light-emitting position by changing any of the phase of the striped pattern, the period of stripes of the striped pattern and the direction of the stripes; and a step of changing the radiation direction by controlling turning on and turning off of the plurality of light-emitting units 31 and 31A to 31E of each of the plurality of illumination elements 21 of the illumination unit 20, 120, 220 and 320.

The embodiments disclosed herein are to be construed in all aspects as illustrative and not restrictive. The scope of the present disclosure should be determined by the appended claims and their legal equivalents, not by the above description, and all changes coming within the meaning and equivalency range of the appended claims are intended to be embraced therein. In addition, the disclosures described in embodiments and modified examples are intended to be embodied in an independent or a combined manner.

What is claimed is:

1. An image inspection apparatus comprising:
   a camera which captures images of an object;
   a transparent illumination device which is disposed between the object and the camera, has a light-emitting surface which radiates light to the object and is configured to be able to control a light-emitting position on the light-emitting surface and a radiation direction of the light, wherein the transparent illumination device includes a surface light source; and
   a processor which is configured to control the camera and the illumination unit,
   wherein the processor causes the transparent illumination device to change the light-emitting position and the radiation direction, causes the camera to capture images of the object, identifies a light-emitting position and a radiation direction of the transparent illumination device when a measurement point of the surface of the object is illuminated from images of the object, and calculates a distance to the measurement point on the basis of the identified light-emitting position and the identified radiation direction,
   wherein the transparent illumination device includes a plurality of illumination elements disposed in a matrix form,
   wherein each of the plurality of illumination elements includes a plurality of organic electroluminescence arranged in a matrix form and configured to be able to selectively emit light, and an optical system configured to control a radiation direction of light emitted from each of the plurality of organic electroluminescence to be a direction corresponding to the position of each of the plurality of organic electroluminescence,
   wherein the processor radiates light in a striped pattern to the object by controlling turning on and turning off of each of the plurality of illumination elements of the transparent illumination device and changes the light-emitting position by changing any of the phase of the striped pattern, the period of stripes of the striped pattern and the direction of the stripes, so as to generate a state equivalent to dynamically scanning the light in the striped pattern on the surface of the object, and
   wherein the processor changes the radiation direction by controlling turning on and turning off of the plurality of organic electroluminescence of each of the plurality of illumination elements of the transparent illumination device.

2. The image inspection apparatus according to claim 1, wherein the camera captures images of the object multiple times to generate a plurality of first captured images when the transparent illumination device illuminates the object while changing the light-emitting position,
   the camera captures images of the object multiple times to generate a plurality of second captured images when the transparent illumination device illuminates the object while changing the radiation direction, and
   the processor generates a first data array having information about the light-emitting position for illuminating the measurement point of the object from the plurality of first captured images,
   the processor generates a second data array having information about the radiation direction for illuminating the measurement point of the object from the plurality of second captured images, and
   the processor calculates the distance from the information on the light-emitting position included in the first data array and the information on the radiation direction included in the second data array.

3. The image inspection apparatus according to claim 1, wherein the optical system includes a plurality of micro-lenses provided to face the plurality of organic electroluminescence.

4. The image inspection apparatus according to claim 3, wherein the plurality of micro-lenses are disposed such that optical axes of at least some of the micro-lenses deviate from optical axes of organic electroluminescence facing the at least some of the micro-lenses.

5. The image inspection apparatus according to claim 4, wherein, in at least one of the plurality of illumination elements, the at least some micro-lenses are disposed at a pitch less than a pitch of the organic electroluminescence.

6. The image inspection apparatus according to claim 3, wherein the plurality of micro-lenses are disposed such that the optical axes of at least some of the plurality of micro-lenses are inclined with respect to the optical axes of organic electroluminescence facing the at least some of the micro-lenses.

7. The image inspection apparatus according to claim 3, wherein the transparent illumination device further includes a light-shielding material configured to shield light leaking from the edge of each of the plurality of micro-lenses among light emitted from the plurality of organic electroluminescence, wherein the light shielding material surrounds the edge of each of the plurality of micro-lenses.

8. An image inspection method performed by an image inspection apparatus including: a camera which captures images of an object; a transparent illumination device which is disposed between the object and the camera, has a light-emitting surface which radiates light to the object and is configured to be able to control a light-emitting position on the light-emitting surface and a radiation direction of the light, wherein the transparent illumination device includes a surface light source; and a processor which is configured to control the camera and the transparent illumination device, the image inspection method comprising:
   a step in which the transparent illumination device changes the light-emitting position and the radiation direction and the camera captures images of the object;
   a step of identifying a light-emitting position and a radiation direction of the transparent illumination device when a measurement point of the surface of the object is illuminated from images of the object acquired in the step of capturing images; and
   a step of calculating a distance to the measurement point on the basis of the identified light-emitting position and the identified radiation direction, wherein the transparent illumination device includes a plurality of illumination elements disposed in a matrix form, wherein each of the plurality of illumination elements includes a plurality of organic electroluminescence arranged in a matrix form and configured to be able to selectively emit light, and an optical system configured to control a radiation direction of light emitted from each of the plurality of organic electroluminescence to be a direction corresponding to the position of each of the plurality of organic electroluminescence, and wherein the step in which the transparent illumination device changes the light-emitting position and the radiation direction comprises:

a step of radiating light in a striped pattern to the object by controlling turning on and turning off of each of the plurality of illumination elements of the transparent illumination device and changing the light-emitting position by changing any of the phase of the striped pattern, the period of stripes of the striped pattern and the direction of the stripes, so as to generate a state equivalent to dynamically scanning the light in the striped pattern on the surface of the object; and a step of changing the radiation direction by controlling turning on and turning off of the plurality of organic electroluminescence of each of the plurality of illumination elements of the transparent illumination device.

9. The image inspection method according to claim 8, wherein the step of capturing images comprises:

a step of capturing images of the object multiple times to generate a plurality of first captured images when the transparent illumination device illuminates the object while changing the light-emitting position; and a step of capturing images of the object multiple times to generate a plurality of second captured images when the transparent illumination device illuminates the object while changing the radiation direction, and the step of identifying the light-emitting position and the radiation direction comprises:

a step of generating a first data array having information about the light-emitting position for illuminating the measurement point of the object from the plurality of first captured images; and a step of generating a second data array having information about the radiation direction for illuminating the measurement point of the object from the plurality of second captured images, and the step of calculating comprises a step of calculating the distance from the information on the light-emitting position included in the first data array and the information on the radiation direction included in the second data array.

10. The image inspection apparatus according to claim 4, wherein the transparent illumination device further includes a light-shielding material configured to shield light leaking from the edge of each of the plurality of micro-lenses among light emitted from the plurality of organic electroluminescence, wherein the light shielding material surrounds the edge of each of the plurality of micro-lenses.

11. The image inspection apparatus according to claim 5, wherein the transparent illumination device further includes a light-shielding material configured to shield light leaking from the edge of each of the plurality of micro-lenses among light emitted from the plurality of organic electroluminescence, wherein the light shielding material surrounds the edge of each of the plurality of micro-lenses.

12. The image inspection apparatus according to claim 6, wherein the transparent illumination device further includes a light-shielding material configured to shield light leaking from the edge of each of the plurality of micro-lenses among light emitted from the plurality of organic electroluminescence, wherein the light shielding material surrounds the edge of each of the plurality of micro-lenses.

13. The image inspection method according to claim 9, wherein the transparent illumination device includes a plurality of illumination elements disposed in a matrix form, wherein each of the plurality of illumination elements includes a plurality of organic electroluminescence arranged in a matrix form and configured to be able to selectively emit light, and an optical system configured to control a radiation direction of light emitted from each of the plurality of organic electroluminescence to be a direction corresponding to the position of each of the plurality of organic electroluminescence, and wherein the step in which the transparent illumination device changes the light-emitting position and the radiation direction comprises:

a step of radiating light in a striped pattern to the object by controlling turning on and turning off of each of the plurality of illumination elements of the transparent illumination device and changing the light-emitting position by changing any of the phase of the striped pattern, the period of stripes of the striped pattern and the direction of the stripes; and a step of changing the radiation direction by controlling turning on and turning off of the plurality of organic electroluminescence of each of the plurality of illumination elements of the transparent illumination device.

* * * * *